(12) United States Patent
Sugimoto et al.

(10) Patent No.: US 9,563,141 B2
(45) Date of Patent: Feb. 7, 2017

(54) TONER, DEVELOPER, AND IMAGE FORMING APPARATUS

(71) Applicants: Tsuyoshi Sugimoto, Shizuoka (JP);
Hiroshi Yamashita, Shizuoka (JP);
Daisuke Asahina, Shizuoka (JP);
Susumu Chiba, Shizuoka (JP);
Satoyuki Sekiguchi, Shizuoka (JP)

(72) Inventors: Tsuyoshi Sugimoto, Shizuoka (JP);
Hiroshi Yamashita, Shizuoka (JP);
Daisuke Asahina, Shizuoka (JP);
Susumu Chiba, Shizuoka (JP);
Satoyuki Sekiguchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/758,402

(22) PCT Filed: Jan. 20, 2014

(86) PCT No.: PCT/JP2014/051593
§ 371 (c)(1),
(2) Date: Jun. 29, 2015

(87) PCT Pub. No.: WO2014/125909
PCT Pub. Date: Aug. 21, 2014

(65) Prior Publication Data
US 2016/0004179 A1    Jan. 7, 2016

(30) Foreign Application Priority Data

Feb. 13, 2013 (JP) ................................. 2013-025166

(51) Int. Cl.
*G03G 9/087* (2006.01)
*C08G 81/00* (2006.01)

(52) U.S. Cl.
CPC ...... *G03G 9/08788* (2013.01); *G03G 9/08755* (2013.01); *G03G 9/08764* (2013.01);
(Continued)

(58) Field of Classification Search
CPC ............ G03G 9/08757; G03G 9/08764; G03G 9/08775; G03G 9/08788
See application file for complete search history.

(56) References Cited

U.S. PATENT DOCUMENTS 8,795,940 B2   8/2014   Sugimoto et al.
8,932,789 B2   1/2015   Sugimoto et al.
(Continued)

FOREIGN PATENT DOCUMENTS

EP   2 270 603          1/2011
EP   2 410 381 A1       1/2012
(Continued)

OTHER PUBLICATIONS

Extended European Search Report issued on Feb. 9, 2016 in European Patent Application No. 14752080.3.
(Continued)

*Primary Examiner* — Peter Vajda
(74) *Attorney, Agent, or Firm* — Oblon, McClelland, Maier & Neustadt, L.L.P.

(57) ABSTRACT

A toner, including: a copolymerization resin, wherein the copolymerization resin includes: a unit derived from a polyester resin including a polycarboxylic acid having a valence of 2 or more and a polyol having a valence of 2 or more; and a unit derived from a resin having a polyhydroxycarboxylic acid skeleton, where the unit derived from the resin having a polyhydroxycarboxylic acid skeleton is bonded to the unit derived from the polyester resin via at
(Continued)

least one of a urethane group and a urea group, and wherein the toner has a relative degree of crystallization of 10% or more and less than 50%.

10 Claims, 4 Drawing Sheets

(52) U.S. Cl.
CPC ..... *G03G 9/08795* (2013.01); *G03G 9/08797* (2013.01); *C08G 81/00* (2013.01)

(56) References Cited

U.S. PATENT DOCUMENTS

| | | | |
|---|---|---|---|
| 2005/0250037 A1 | 11/2005 | Sawada et al. | |
| 2010/0104965 A1 | 4/2010 | Inoue et al. | |
| 2010/0216068 A1* | 8/2010 | Kotsugai | G03G 9/08755 430/109.4 |
| 2011/0065036 A1 | 3/2011 | Inoue et al. | |
| 2011/0129775 A1 | 6/2011 | Sawada et al. | |
| 2011/0281213 A1 | 11/2011 | Sakashita et al. | |
| 2012/0021348 A1 | 1/2012 | Kaya et al. | |
| 2012/0021349 A1 | 1/2012 | Tani et al. | |
| 2012/0065357 A1 | 3/2012 | Yamauchi et al. | |
| 2012/0288791 A1 | 11/2012 | Sakashita et al. | |
| 2013/0065172 A1 | 3/2013 | Moriya et al. | |
| 2013/0149642 A1 | 6/2013 | Sabu et al. | |
| 2013/0337374 A1 | 12/2013 | Sugimoto et al. | |

FOREIGN PATENT DOCUMENTS

| | | |
|---|---|---|
| JP | 2579150 | 11/1996 |
| JP | 11-133665 | 5/1999 |
| JP | 2001-158819 | 6/2001 |
| JP | 2002-287400 | 10/2002 |
| JP | 2002-351143 | 12/2002 |
| JP | 2005-338814 | 12/2005 |
| JP | 2007-033773 | 2/2007 |
| JP | 2009-300848 | 12/2009 |
| JP | 2010-128114 | 6/2010 |
| JP | 2010-271583 | 12/2010 |
| JP | 2011-059603 | 3/2011 |
| JP | 2012-237859 | 12/2012 |
| JP | 2014-002244 | 1/2014 |
| RU | 2 372 635 | 11/2009 |

OTHER PUBLICATIONS

International Search Report Issued Mar. 11, 2014 for counterpart International Patent Application No. PCT/JP2014/051593 filed Jan. 20, 2014.

Office Action dated Nov. 18, 2016, in Russian Patent Application No. 2015138719 (with English Translation).

* cited by examiner

TONER, DEVELOPER, AND IMAGE FORMING APPARATUS

TECHNICAL FIELD

The present invention relates to a toner, a developer, and an image forming apparatus.

BACKGROUND ART

These days, toners need to have a smaller particle size for higher quality of output images, high temperature off-set resistance, low temperature fixing properties for energy saving, and heat-resistant preservation properties meaning endurance under a high temperature and high humidity environment during preservation and transportation of the toners. Especially the power consumed during fixing constitutes a large part of the total power consumption in the image forming method, and it is very important to improve the low temperature fixing properties.

Toners produced by a kneading pulverization method have been used. In this method, a colorant, a mold release agent, and the like are melted and mixed in a binder resin and uniformly dispersed to prepare a toner composition, and the toner composition is ground and classified to produce a toner. The toner produced by the kneading pulverization method is difficult to attain a reduction in the particle size. Additionally, the toner has an amorphous shape and a broad particle size distribution, leading to insufficient quality of an output image and high fixing energy. When a mold release agent (wax) is added to improve fixing properties, the toner produced by the kneading pulverization method will crack at the interface of the wax in grinding, and a large amount of the wax will exist on the toner surface. For this reason, although a release effect is attained, the toner will adhere to a carrier, a photoconductor, and a cleaning blade (filming), leading to unsatisfactory total performance of the toner.

To solve the above problems of the toner produced by the kneading pulverization method, various methods for producing a toner by a polymerization method have been proposed. The toner produced by the polymerization method has a smaller particle size and a sharp particle size distribution, enabling encapsulation of the mold release agent.

An exemplary method for producing a toner by the polymerization method is proposed in which to improve low temperature fixing properties and high temperature off-set resistance, a toner is produced from an elongation reaction product of a urethane-modified polyester (see PTL 1).

Toners having a smaller particle size are proposed having excellent powder fluidity and transfer properties and excellent heat-resistant preservation properties, low temperature fixing properties, and high temperature off-set resistance (see PTLs 2 and 3).

Toner production methods are proposed including a step of producing a toner binder having a stable molecular weight distribution and an aging step for attaining low temperature fixing properties and high temperature off-set resistance at the same time (see PTLs 4 and 5).

These proposed techniques, however, cannot provide a higher level of low temperature fixing properties which are demanded these days.

To attain a higher level of low temperature fixing properties, a toner is proposed, the toner including a resin (a) having no polyhydroxycarboxylic acid skeleton of an photoactive monomer and a resin (b) having a polyhydroxycarboxylic acid skeleton of a photoactive monomer, wherein the resin (a) is a crystalline polyester resin (see PTL 6), for example.

Another toner is proposed, the toner including a core of a block copolymer having a crystalline polyester block and a non-crystalline polyester block and an outer shell of a non-crystalline polyester resin (see PTL 7).

According to these proposals, the toner can attain low temperature fixing properties because the crystalline polyester resin melts faster than the non-crystalline polyester resin. While the crystalline polyester resin as the island in the sea-island phase separated structure is melted, the non-crystalline polyester resin as the sea occupying most of the structure is not melted yet. The fixing is attained when both the crystalline polyester resin and the non-crystalline polyester resin are melted to a certain degree. Consequently, these proposed techniques cannot provide a higher level of low temperature fixing properties.

Accordingly, it is desired to provide a toner having excellent low temperature fixing properties, high temperature off-set resistance, and heat-resistant preservation properties without producing filming.

CITATION LIST

Patent Literature

PTL 1: Japanese Patent Application Laid-Open (JP-A) No. 11-133665
PTL 2: Japanese Patent Application Laid-Open (JP-A) No. 2002-287400
PTL 3: Japanese Patent Application Laid-Open (JP-A) No. 2002-351143
PTL 4: Japanese Patent (JP-B) No. 2579150
PTL 5: Japanese Patent Application Laid-Open (JP-A) No. 2001-158819
PTL 6: Japanese Patent Application Laid-Open (JP-A) No. 2011-59603
PTL 7: Japanese Patent Application Laid-Open (JP-A) No. 2009-300848

SUMMARY OF INVENTION

Technical Problem

An object of the present invention is to provide a toner having excellent low temperature fixing properties, high temperature off-set resistance, and heat-resistant preservation properties without producing filming.

Solution to Problem

As a solution to the problems, the toner according to the present invention contains at least a copolymerization resin having a unit derived from a polyester resin including a polycarboxylic acid having a valence of 2 or more and a polyol having a valence of 2 or more, and a unit derived from a resin having a polyhydroxycarboxylic acid skeleton bonded to the polyester resin unit via at least one of a urethane group and a urea group, wherein the toner has a relative degree of crystallization of 10% or more and less than 50%.

Advantageous Effects of Invention

The present invention can solve the problems in the related art, and can provide a toner having excellent low temperature fixing properties, high temperature off-set resistance, and heat-resistant preservation properties without producing filming.

DESCRIPTION OF EMBODIMENTS (Toner)

Figure 1:
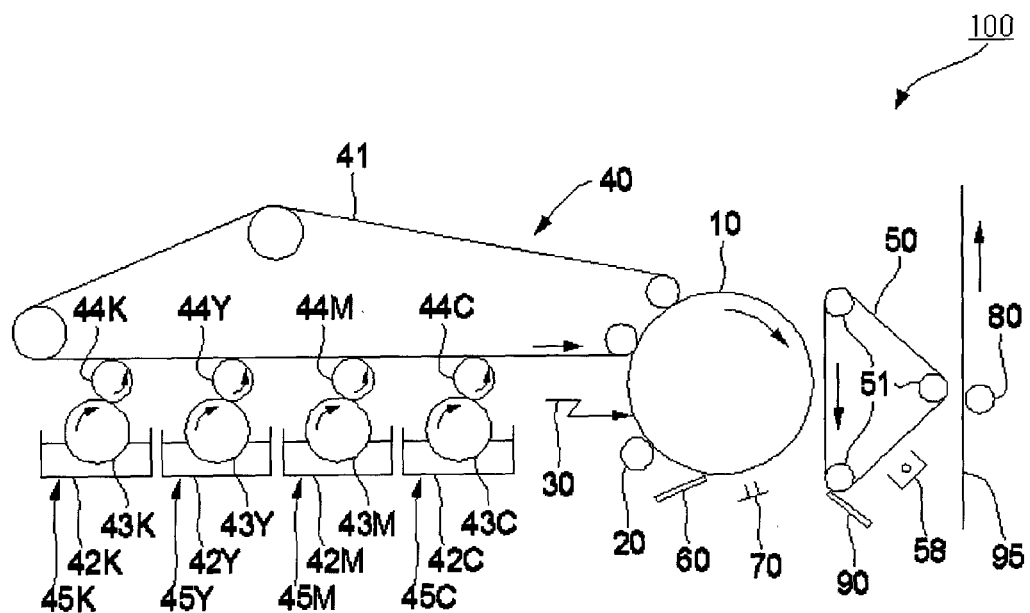
FIG. 1 is a schematic view showing an exemplary image forming apparatus according to the present invention.

The toner according to the present invention contains at least a copolymerization resin including: a unit derived from a polyester resin including a polycarboxylic acid having a valence of 2 or more and a polyol having a valence of 2 or more; and a unit derived from a resin having a polyhydroxycarboxylic acid skeleton, where the unit derived from a resin having a polyhydroxycarboxylic acid skeleton is bonded to the unit derived from the polyester resin via at least one of a urethane group and a urea group. The toner preferably contains a colorant, and further contains other components when necessary.

In the present invention, the toner has a relative degree of crystallization of 10% or more and less than 50%, and preferably 20% to 40%. At a relative degree of crystallization of the toner less than 10%, the crystallinity of the toner may decrease to impair sharp melt properties, reducing low temperature fixing properties and heat-resistant preservation properties. At a degree of 50% or more, the hardness of the toner may decrease to cause image defects attributed to aggregation and solidification of the toner when a stress is applied to the toner by stirring or compression in a toner bottle or a developing cartridge, for example.

The relative degree of crystallization of the toner can be measured by an X ray diffraction method, for example.

Specifically, the relative degree of crystallization of the toner can be measured by the X ray diffraction method with a crystal analysis X ray diffraction apparatus (X'Pert MRDX'Pert MRD, made by Royal Philips) as follows.

First, the target sample toner was pounded with a mortar to produce a sample powder. The obtained sample powder was uniformly applied to a sample holder. Subsequently, the sample holder is disposed in the crystal analysis X ray diffraction apparatus, and the measurement is performed to obtain a diffraction spectrum.

From the obtained diffraction peaks, the peaks in the range of 20°<2θ<25° are defined as an endothermic peak derived from the polyester resin including a polycarboxylic acid having a valence of 2 or more and a polyol having a valence of 2 or more. The broad peak ranging widely in the measured region is defined as a component derived from the non-crystalline resin. In the endothermic peak and the broad peak, a background is removed from the diffraction spectrum and an integrated area is calculated. The area value derived from the polyester resin including a polycarboxylic acid having a valence of 2 or more and a polyol having a valence of 2 or more is defined as Sc, and the area value derived from the non-crystalline resin is defined as Sa. From Sc/Sa, the relative degree of crystallization can be calculated.

The measurement conditions for the X ray diffraction method will be shown below.

[Measurement Conditions]

Tension kV: 45 kV
Current: 40 mA
MPSS
Upper
Gonio
Scan mode: continuous
Start angle: 3°
End angle: 35°
Angle Step: 0.02°
Lucident Beam Optics
Divergence slit: Div slit ½
Difflection Beam Optics
Anti scatter slit: As Fixed ½
Receiving slit: Prog rec slit The unit derived from a polyester resin including a polycarboxylic acid having a valence of 2 or more and a polyol having a valence of 2 or more preferably has a crystal structure to attain a constant relative degree of crystallization at which the present invention aims.

When the unit derived from the polyester resin has a crystalline structure (unit derived from the crystalline polyester resin), the crystallinity is kept to attain high heat-resistant preservation properties of the toner. Additionally, with the melting of the crystal structure, the unit derived from the resin having a polyhydroxycarboxylic acid skeleton also can be softened to a melt viscosity allowing adhesion to a recording medium.

The unit derived from the resin having a polyhydroxycarboxylic acid skeleton has a repeating unit derived from a compound obtained by dehydration condensation of lactic acid, and has excellent affinity for a main recording medium, that is, paper. This attains excellent adhesiveness.

As above, the toner according to the present invention can attain a higher level of low temperature fixing properties than those in the related art.

The crystalline polyester resin and the resin having a unit derived from the crystalline polyester resin melt rapidly at a certain temperature. Although crystalline, these resins have lower hardness and higher fragility than those of the non-crystalline resin. For this reason, the toner containing a large amount of the crystalline polyester resin or the resin having a unit derived from the crystalline polyester resin tends to aggregate or solidify, for example, when a stress is applied by stirring or compression in a toner bottle or a developing cartridge, causing image defects.

In the present invention, use of a copolymerization resin prepared by chemically bonding the unit derived from the crystalline polyester resin to the unit derived from the non-crystalline resin having a polyhydroxycarboxylic acid skeleton with at least one of a urethane group and a urea group can suppress a reduction in the hardness and fragility of the toner when the unit derived from the crystalline polyester resin is added. Furthermore, in the present invention, the unit derived from the crystalline polyester resin is bonded to the unit derived from the resin having a polyhydroxycarboxylic acid skeleton with at least one of a urethane group and a urea group both having a strong aggregation force. Such a bond can enhance the hardness of the toner by the aggregation force of at least one of a urethane group and a urea group.

While the crystalline polyester resin and the resin having a unit derived from the crystalline polyester resin dissolve rapidly at the melting point, these resins have low melt viscosity. For this reason, off-set properties tend to reduce in fixing the toner on the recording medium with a fixing roller or the like. In the present invention, the introduction of the urethane group or urea group having a strong aggregation force can expand a suitable range of the melt viscosity allowing low temperature fixing of the toner without off-set to enhance off-set resistance.

The glass transition temperature Tg of the toner measured by a differential scanning calorimetry (DSC method) can be properly selected according to the purpose without limitation. The glass transition temperature is preferably 20° C. or more and less than 50° C., and more preferably 20° C. to 40° C. for low temperature fixing properties.

At a glass transition temperature less than 20° C., heat-resistant preservation properties may reduce even if the unit derived from the crystalline polyester resin exists in the toner. At a glass transition temperature of 50° C. or more, the melting of the unit derived from the resin having a polyhydroxycarboxylic acid skeleton, compared to the unit derived from the crystalline polyester resin in the toner, may be insufficient, causing poor low temperature fixing properties. At a glass transition temperature within the preferred range, the toner advantageously can have low temperature fixing properties and heat-resistant preservation properties at the same time.

The endothermic peak temperature mp of the toner measured by the differential scanning calorimetry (DSC method) can be properly selected according to the purpose without limitation. The endothermic peak temperature is preferably 50° C. or more and less than 80° C., and more preferably 55° C. to 70° C. At an endothermic peak temperature less than 50° C., the unit derived from the crystalline polyester resin may melt in an expected high temperature preservation environment for the toner, reducing the heat-resistant preservation properties of the toner. At an endothermic peak temperature of 80° C. or more, although the unit derived from the resin having a polyhydroxycarboxylic acid skeleton softens, the unit derived from the crystalline polyester resin may barely melt unless the temperature is elevated, reducing the low temperature fixing properties of the toner.

The toner can be properly selected according to the purpose without limitation. Preferably, a ratio Q2/Q1 is 0 or more and less than 0.30 wherein Q1 is the amount of heat absorbed in a first raising of the temperature in DSC by melting the unit derived from the crystalline polyester resin and Q2 is the amount of heat absorbed in a second raising of the temperature in DSC. The amount of heat absorbed Q1 can be properly selected according to the purpose without limitation. The amount is preferably more than 10 J/g, and more preferably 20 J/g or more. The upper limit is preferably 100 J/g or less.

At a ratio Q2/Q1 of 0.30 or more, the heat in the fixing may cause insufficient miscibility between the unit derived from the crystalline polyester resin and the unit derived from the resin having a polyhydroxycarboxylic acid skeleton in the toner, leading to poor low temperature fixing properties and high temperature off-set resistance of the toner.

At an amount of heat absorbed Q1 of 10 J/g or less, the amount of the unit derived from the crystalline polyester resin present in the toner may reduce, the deformation of the toner cannot be suppressed under an expected high temperature preservation environment for the toner, reducing the heat-resistant preservation properties of the toner.

According to the DSC method, the glass transition temperature Tg of the toner, the endothermic peak temperature mp of the toner, and the amount of heat absorbed by the toner (Q1 and Q2) can be measured as follows.

To keep the initial state of the toner constant, the toner measured is kept under a constant temperature environment at 45° C. and a humidity of 20% RH or less for 24 hours. The toner is then preserved at a temperature of 23° C. or less, and the Tg, mp, Q1, and Q2 are measured within 24 hours. This procedure can reduce influences of the heat history in such a high temperature preservation environment on the inner state of the toner to provide a constant inner state of the toner.

First, 5 mg of toner particles is sealed in a T-Zero easily sealed pan made by TA Instruments-Waters LLC, and measured with a differential scanning calorimeter (DSC) (made by TA Instruments-Waters LLC, Q2000). In the measurement, under a nitrogen stream, the temperature is raised from −20° C. to 200° C. at a temperature raising rate of 10° C./min as the first raising, and kept for 5 minutes. The temperature is lowered to −20° C. at a temperature raising rate of 10° C./min, and kept for 5 minutes. Next, as the second raising, the temperature is raised to 200° C. at a temperature raising rate of 10° C./min, and the change in heat is measured. The "amounts of heat absorbed and heat generated" and the "temperature" are plotted. The temperature at a characteristic inflection point observed at this time is defined as the glass transition temperature Tg.

The glass transition temperature Tg can be a value obtained using the graph representing the first raising of the temperature by a mid point method in the analysis program in the apparatus.

For the endothermic peak temperature mp, the temperature at the highest peak can be calculated using the graph representing the first raising of the temperature by the analysis program in the apparatus.

For the Q1, the amount of the heat of melting of the crystalline component can be calculated using the graph representing the first raising of the temperature by the analysis program in the apparatus.

For the Q2, the amount of the heat of melting of the crystalline component can be calculated using the graph representing the second raising of the temperature by the analysis program in the apparatus.

The amount of compression deformation at 50° C. of the toner obtained by a thermomechanical analysis method (amount of TMA compression deformation) can be properly selected according to the purpose without limitation. The amount of compression deformation is preferably 5% or less, and more preferably 1% to 4%. At an amount of TMA compression deformation more than 5%, toners may deform and fuse to each other under an expected high temperature preservation environment for the toner, reducing the heat-resistant preservation properties of the toner. At an amount of TMA compression deformation within the preferred range, the toner can advantageously have low temperature fixing properties and heat-resistant preservation properties at the same time.

The amount of TMA compression deformation can be measured using a tablet prepared from 0.5 g of the toner with a tableting machine having a diameter of 3 mm (made by SHIMADZU Corporation) with a thermomechanical analyzer (made by SH NanoTechnology Inc., EXSTAR7000). In the measurement, under a nitrogen stream, the temperature is raised from 0° C. to 180° C. at 2° C./min. The amount of TMA compression deformation is measured in a compression mode. The compression force at this time is 100 mN. From the graph of the obtained sample temperature and compression displacement (deformation rate), the amount of compression deformation at 50° C. is read, and the value is defined as the amount of TMA compression deformation.

<<Unit Derived from Crystalline Polyester Resin>>

The unit derived from a polyester resin including a polycarboxylic acid having a valence of 2 or more and a polyol having a valence of 2 or more constitutes the copolymerization resin in the present invention. One preferred embodiment of the unit is a unit derived from the crystalline polyester resin. For the unit derived from the crystalline polyester resin, any unit derived from the crystalline polyester resin can be properly selected according to the purpose without limitation.

Any crystalline polyester resin can be properly selected according to the purpose without limitation. Among such polyester resins, aliphatic polyester resins are particularly preferred for their excellent sharp melt properties and high crystallinity.

The crystalline polyester resin is prepared by polycondensing a polyhydric alcohol with a polyvalent carboxylic acid such as polyvalent carboxylic acids, polyvalent carboxylic anhydrides, and polyvalent carboxylic acid esters, or a derivative thereof.

—Polyhydric Alcohol—

Any polyhydric alcohol can be properly selected according to the purpose without limitation. Examples thereof include diol and alcohols having a valence of 3 or more.

Examples of the diol include saturated aliphatic diols. Examples of the saturated aliphatic diol include linear saturated aliphatic diols and branched saturated aliphatic diols. Among these, linear saturated aliphatic diols are preferable, and linear saturated aliphatic diols having 2 or more and 12 or less carbon atoms are more preferable. A branched saturated aliphatic diol may reduce the crystallinity of the crystalline polyester resin to decrease the melting point. The saturated aliphatic diol having more than 12 carbon atoms may be less available. Accordingly, the number of the carbon atoms is more preferably 12 or less.

Examples of the saturated aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. These may be used singly or in combinations of two or more.

Among these, ethylene glycol, 1,4-butanediol, 1,6-hexanediol, 1,8-octanediol, 1,10-decanediol, and 1,12-dodecanediol are particularly preferred because the crystalline polyester resin has high crystallinity and excellent sharp melt properties.

Examples of the alcohols having a valence of 3 or more include glycerol, trimethylolethane, trimethylolpropane, and pentaerythritol. These may be used singly or in combinations of two or more.

—Polyvalent Carboxylic Acid—

Any polyvalent carboxylic acid can be properly selected according to the purpose without limitation. Examples thereof include divalent carboxylic acids and carboxylic acids having a valence of 3 or more.

Examples of the divalent carboxylic acid include saturated aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids such as phthalic acid, isophthalic acid, terephthalic acid, naphthalene-2,6-dicarboxylic acid, malonic acid, and mesaconic acid, anhydrides thereof, or lower (1 to 3 carbon atoms) alkyl esters thereof. These may be used singly or in combinations of two or more.

Examples of the carboxylic acid having a valence of 3 or more include 1,2,4-benzenetricarboxylic acid, 1,2,5-benzenetricarboxylic acid, 1,2,4-naphthalenetricarboxylic acid, anhydrides thereof, or lower (1 to 3 carbon atoms) alkyl esters thereof. These may be used singly or in combinations of two or more.

Another polyvalent carboxylic acid such as dicarboxylic acid having a sulfonic acid group and a dicarboxylic acid having a double bond may be contained besides the saturated aliphatic dicarboxylic acid and the aromatic dicarboxylic acid.

The crystalline polyester resin is preferably prepared by polycondensing a linear saturated aliphatic dicarboxylic acid having 4 or more and 12 or less carbon atoms with a linear saturated aliphatic diol having 2 or more and 12 or less carbon atoms. That is, the crystalline polyester resin preferably has a structural unit derived from a saturated aliphatic dicarboxylic acid having 4 or more and 12 or less carbon atoms and a structural unit derived from a saturated aliphatic diol having 2 or more and 12 or less carbon atoms. As a result, the crystalline polyester resin obtained has high crystallinity and excellent sharp melt properties, and therefore the toner can exhibit excellent low temperature fixing properties.

The crystallinity, molecular structure, and the like of the crystalline polyester resin can be confirmed by the measurement according to NMR, differential scanning calorimetry (DSC), X ray diffraction, GC/MS, LC/MS, infrared radiation absorption (IR) spectrum, or the like.

The melting point of the crystalline polyester resin can be properly selected according to the purpose without limitation. Preferably, the melting point is 50° C. to 80° C. At a melting point less than 50° C., the crystalline polyester resin may melt at a low temperature, reducing the heat-resistant preservation properties of the toner. At a melting point more than 80° C., the crystalline polyester resin may insufficiently melt by the heat in the fixing, reducing the low temperature fixing properties of the toner.

The weight average molecular weight of the crystalline polyester resin can be properly selected according to the purpose without limitation. The weight average molecular weight is preferably 3,000 to 50,000, and more preferably 5,000 to 25,000.

The weight average molecular weight of the crystalline polyester resin can be measured by gel permeation chromatography (GPC), for example.

The glass transition temperature of the crystalline polyester resin can be properly selected according to the purpose without limitation. Preferably, the glass transition temperature is 50° C. to 70° C.

The glass transition temperature of the crystalline polyester resin can be measured by the differential scanning calorimetry (DSC method), for example.

The content of the crystalline polyester resin in the toner can be properly selected according to the purpose without limitation. The content is preferably 3% by mass to 30% by mass, and more preferably 5% by mass to 20% by mass. At a content less than 3% by mass, the heat-resistant preservation properties and low temperature fixing properties of the toner may reduce. At a content more than 30% by mass, filming may occur, leading to poor high temperature off-set resistance.

<<Unit Derived from Resin Having Polyhydroxycarboxylic Acid Skeleton>>

Any unit derived from the resin having a polyhydroxycarboxylic acid skeleton can be properly selected according to the purpose without limitation.

The resin having a polyhydroxycarboxylic acid skeleton is a resin having a repeating unit derived from a compound obtained by dehydration condensation of lactic acid. The resin has excellent affinity for the main recording medium, that is, paper, and attains excellent heat-resistant preservation properties of the toner. Among these, a non-crystalline polylactic acid resin prepared using a racemized lactic acid including L-lactic acid and D-lactic acid as a raw material is particularly preferred for excellent low temperature fixing properties of the toner.

In the resin having a polyhydroxycarboxylic acid skeleton, the optical purity X (%) represented by the following expression in terms of a monomer component can be properly selected according to the purpose without limitation. The optical purity X is preferably 90% or less.

$$X(\%) = |X(L\text{-form}) - X(D\text{-form})|$$

wherein X (L-form) represents the ratio (%) of L-form in terms of the lactic acid monomer; and X (D-form) represents the ratio (%) of the D-form in terms of the lactic acid monomer.

Any method for measuring the optical purity X can be properly selected according to the purpose without limitation. For example, a polymer or toner having a polyester skeleton is added to a mixed solvent of pure water, 1 N sodium hydroxide, and isopropyl alcohol, and the mixture is heated and stirred at 70° C. for hydrolysis. The mixture is then filtered to remove the solid content in the solution, and sulfuric acid is added to neutralize the filtrate. An aqueous solution containing at least one of L-lactic acid and D-lactic acid decomposed from the polyester resin is prepared. The aqueous solution was measured with a high performance liquid chromatograph (HPLC) including a chiral ligand exchange type column SUMICHIRAL OA-5000 (made by Sumika Chemical Analysis Service, Ltd.), and the peak area S (L) derived from L-lactic acid and the peak area S (D) derived from D-lactic acid were calculated. From the peak areas, the optical purity X can be determined as follows.

$$X(L\text{-form}) \% = 100 \times S(L)/(S(L)+S(D))$$

$$X(D\text{-form}) \% = 100 \times S(D)/(S(L)+S(D))$$

$$\text{optical purity } X\% = |X(L\text{-form}) - X(D\text{-form})|$$

The L-form and D-form used as raw materials are optical isomers. The optical isomers have the same physical and chemical properties except optical properties. When the optical isomers are used for polymerization, the optical isomers are equally reactive so that the ratio of the monomer components is the same as the ratio of monomer components in the polymer.

The optical purity is preferably 90% or less because solubility in the solvent and transparency of the resin are enhanced.

The ratio of the monomers X (D-form) and X (L-form) that form the resin having a polyhydroxycarboxylic acid skeleton is the same as the ratio of the monomers D-form and L-form used to form the resin having a polyhydroxycarboxylic acid skeleton. The optical purity X (%) can be controlled in terms of the monomer component in the resin having a polyhydroxycarboxylic acid skeleton as the non-crystalline resin by use of proper amounts of the L-form monomer and the D-form monomer in combination.

Any conventionally known method for producing a resin having a polyhydroxycarboxylic acid skeleton can be used without limitation. Examples of the method for producing a resin having a polyhydroxycarboxylic acid skeleton include a method in which a raw material starch such as corn is fermented to prepare lactic acid, and the lactic acid is directly dehydration condensed; and a method in which lactic acid is converted into cyclic dimer lactide, and the resin is synthesized by ring-opening polymerization of the cyclic dimer lactide in the presence of a catalyst. Among these, the production method by the ring-opening polymerization is preferred because the molecular weight can be controlled by the amount of the initiator and the reaction can be completed in a short time.

The weight average molecular weight of the resin having a polyhydroxycarboxylic acid skeleton can be properly selected according to the purpose without limitation. The weight average molecular weight is preferably 3,000 to 30,000, and more preferably 5,000 to 20,000.

The weight average molecular weight of the resin having a polyhydroxycarboxylic acid skeleton can be measured by gel permeation chromatography (GPC), for example.

The glass transition temperature of the resin having a polyhydroxycarboxylic acid skeleton can be properly selected according to the purpose without limitation. The glass transition temperature is preferably 40° C. to 70° C. At a glass transition temperature less than 40° C., heat-resistant preservation properties may reduce to cause filming. At a glass transition temperature more than 70° C., low temperature fixing properties may reduce.

The glass transition temperature of the resin having a polyhydroxycarboxylic acid skeleton can be measured by differential scanning calorimetry (DSC method), for example.

The content of the resin having a polyhydroxycarboxylic acid skeleton in the toner can be properly selected according to the purpose without limitation. The content is preferably 30% by mass to 90% by mass, and more preferably 50% by mass to 85% by mass.

<<Copolymerization Resin>>

The copolymerization resin is a resin including the unit derived from a polyester resin including a polycarboxylic acid having a valence of 2 or more and a polyol having a valence of 2 or more, preferably the unit derived from the crystalline polyester resin, and the unit derived from the resin having a polyhydroxycarboxylic acid skeleton bonded to the unit derived from the polyester resin via at least one of a urethane group and a urea group.

The copolymerization resin is prepared by reacting a hydroxyl group as the terminal group of the unit derived from a polyester resin including a polycarboxylic acid having a valence of 2 or more and a polyol having a valence of 2 or more and a hydroxyl group as the terminal group of the unit derived from the resin having a polyhydroxycarboxylic acid skeleton with an isocyanate group in an isocyanate compound to bond the unit derived from the polyester resin to the unit derived from the resin having a polyhydroxycarboxylic acid skeleton via at least one of a urethane group and a urea group.

Any isocyanate compound can be properly selected according to the purpose without limitation. Examples of diisocyanates include aromatic diisocyanates having 6 to 20 carbon atoms (excluding carbons in the NCO group; hereinafter the same applies), aliphatic diisocyanates having 2 to 18 carbon atoms, alicyclic diisocyanates having 4 to 15 carbon atoms, aromatic aliphatic diisocyanates having 8 to 15 carbon atoms, or modified products thereof (modified products containing a urethane group, a carbodiimide group, an allophanate group, a urea group, a biuret group, a uretdione group, a uretimine group, an isocyanurate group, an oxazolidone group, or the like). Furthermore, polyisocyanates having a valence of 3 or more may be used in combination when necessary. These may be used singly or in combinations of two or more.

Specific examples of the aromatic diisocyanates (including polyisocyanate having a valence of 3 or more) include 1,3- and/or 1,4-phenylenediisocyanate, 2,4- and/or 2,6-tolylenediisocyanate (TDI), crude TDI, 2,4'- and/or 4,4'-diphenylmethanediisocyanate (MDI), crude MDI [phosgenated products of crude diaminophenylmethane [a condensation product of formaldehyde and aromatic amine (aniline) or a mixture thereof; a mixture of diaminodiphenylmethane and a small amount of (for example, 5% by mass to 20% by mass) polyamine having three or more functionalities]: polyallylpolyisocyanate (PAPI)], 1,5-naphthylenediisocyanate, 4,4',4''-triphenylmethanetriisocyanate, and m- and p-isocyanatophenylsulfonylisocyanates.

Specific examples of the aliphatic diisocyanates (including polyisocyanate having a valence of 3 or more) include ethylenediisocyanate, tetramethylenediisocyanate, hexamethylenediisocyanate (HDI), dodecamethylenediisocyanate, 1,6,11-undecanetriisocyanate, 2,2,4-trimethylhexamethylenediisocyanate, lysinediisocyanate, 2,6-diisocyanatomethyl caproate, bis(2-isocyanatoethyl)fumarate, bis(2-isocyanatoethyl)carbonate, and 2-isocyanatoethyl-2,6-diisocyanatohexanoate.

Specific examples of the alicyclic diisocyanates include isophoronediisocyanate (IPDI), dicyclohexylmethane-4,4'-diisocyanate (hydrogenated MDI), cyclohexylenediisocyanate, methylcyclohexylenediisocyanate (hydrogenated TDI), bis(2-isocyanatoethyl)-4-cyclohexene-1,2-dicarboxylate, and 2,5- and/or 2,6-norbornanediisocyanate.

Specific examples of the aromatic aliphatic diisocyanates include m- and/or p-xylylenediisocyanate (XDI), and $\alpha,\alpha,\alpha',\alpha'$-tetramethylxylylenediisocyanate (TMXDI).

Examples of modified products of the diisocyanates include modified products containing a urethane group, a carbodiimide group, an allophanate group, a urea group, a biuret group, a uretdione group, a uretimine group, an isocyanurate group, or an oxazolidone group.

Specifically, examples thereof include modified products of diisocyanates such as modified MDI (such as urethane modified MDI, carbodiimide modified MDI, and trihydrocarbyl phosphate modified MDI), and urethane modified TDI, and mixtures of two or more thereof (such as a combination of modified MDI with urethane modified TDI (isocyanate-containing prepolymer)).

Among these, aromatic diisocyanates having 6 to 15 carbon atoms, aliphatic diisocyanates having 4 to 12 carbon atoms, and alicyclic diisocyanates having 4 to 15 carbon atoms are preferable, and TDI, MDI, HDI, hydrogenated MDI, and IPDI are particularly preferred.

Any copolymerization method can be properly selected according to the purpose without limitation. Examples of the method include a method in which a resin having a polyhydroxycarboxylic acid skeleton prepared in advance by a polymerization reaction, a crystalline polyester resin prepared in advance by a polymerization reaction, and the isocyanate compound are dissolved or dispersed in a proper solvent; an isocyanate group of the isocyanate compound is reacted with respective hydroxyl groups as terminal groups of the crystalline polyester resin and the resin having a polyhydroxycarboxylic acid skeleton to perform copolymerization.

In this case, NCO/(OHa+OHb), the ratio of the isocyanate group of the isocyanate compound to the hydroxyl value OHa of the crystalline polyester resin and the hydroxyl value OHb of the resin having a polyhydroxycarboxylic acid skeleton can be properly selected according to the purpose without limitation. The ratio is preferably 0.55 to 0.75, and more preferably 0.60 to 0.70. At a ratio NCO/(OHa+OHb) less than 0.55, the hardness of the toner may reduce to reduce filming resistance. At a ratio more than 0.75, the viscoelasticity of the toner in melting may increase to reduce low temperature fixing properties.

The mass ratio A/B of the unit A derived from the polyester resin to the unit B derived from the resin having a polyhydroxycarboxylic acid skeleton in the copolymerization resin can be properly selected according to the purpose without limitation. The mass ratio is preferably 20/80 to 50/50.

At a mass ratio A/B less than 20/80, the ratio of the unit A derived from the polyester resin is low. Such a low ratio may prevent melt viscosity from decreasing sufficiently to reduce low temperature fixing properties. At a mass ratio A/B more than 50/50, the ratio of the unit A derived from the polyester resin is high. Such a high ratio may excessively reduce melt viscosity, leading to poor off-set resistance. Such a high ratio may also reduce the hardness of the copolymerization resin to reduce the stress resistance of the toner.

The weight average molecular weight of the copolymerization resin can be properly selected according to the purpose without limitation. The weight average molecular weight is preferably 20,000 to 100,000. At a weight average molecular weight less than 20,000, melt viscosity may excessively reduce to reduce off-set resistance. The hardness of the copolymerization resin may reduce to reduce the stress resistance of the toner. At a polymerization average molecular weight more than 100,000, melt viscosity may not reduce sufficiently, leading to poor low temperature fixing properties.

The weight average molecular weight of the copolymerization resin can be measured by gel permeation chromatography (GPC), for example.

The content of the copolymerization resin in the toner can be properly selected according to the purpose without limitation. The content is preferably 50% by mass to 95% by mass, and more preferably 70% by mass to 95% by mass. At a content less than 50% by mass, the effects of the copolymerization resin having excellent low temperature fixing properties, heat-resistant preservation properties, and filming resistance may be weakened to reduce these properties. At a content more than 95% by mass, functions exhibited by other materials in the toner such as a mold release agent, a colorant, and a charge controller may reduce, and off-set resistance, image density, sharpness of an image, and charging properties, for example, may reduce.

<<Crystalline Resins Other than Copolymerization Resin>>

Besides the copolymerization resin, the toner according to the present invention preferably further contains a crystalline resin, and the crystalline resin(s) is more preferably a crystalline polyester resin. The crystalline resin(s) further contained may promote melting of the toner, leading to better low temperature fixing properties.

Preferably, the crystalline resin has a common skeleton composed of a monomer unit similar to the unit derived from the polyester resin in the copolymerization resin because such a skeleton enhances the affinity (miscibility) of the unit derived from the crystalline polyester resin in the copolymerization resin with the crystalline resin to attain excellent heat-resistant preservation properties and low temperature fixing properties of the toner.

The content of the crystalline resin other than the copolymerization resin in the toner can be properly selected according to the purpose without limitation. The content is preferably 3% by mass to 20% by mass, and more preferably 5% by mass to 15% by mass. At a content less than 3% by mass, melting of the toner may not be sufficiently promoted to reduce low temperature fixing properties. At a content more than 20% by mass, the hardness of the toner may reduce to reduce filming resistance.

<Colorant>

Any colorant can be properly selected according to the purpose without limitation. Examples thereof include carbon black, nigrosine dyes, iron black, Naphthol Yellow S, Hansa Yellow (10G, 5G, G), cadmium yellow, yellow iron oxide, yellow ocher, chrome yellow, titanium yellow, polyazo yellow, oil yellow, Hansa Yellow (GR, A, RN, R), Pigment Yellow L, benzidine yellow (G, GR), Permanent yellow (NCG), Vulcan Fast yellow (5G, R), tartrazine lake, quinoline yellow lake, Anthrazan yellow BGL, isoindolinone yellow, red iron oxide, red lead oxide, lead vermilion, cadmium red, cadmium mercury red, antimony vermilion, Permanent red 4R, Para red, Fisay red, Parachlororthonitroaniline red, Lithol Fast Scarlet G, Brilliant Fast Scarlet, Brilliant Carmine BS, Permanent red (F2R, F4R, FRL, FRLL, F4RH), fast scarlet VD, Vulcan Fast Lubin B, Brilliant Scarlet G, Lithol Lubin GX, Permanent red FSR, Brilliant Carmine 6B, Pigment Scarlet 3B, Bordeaux 5B, toluidine maroon, Permanent Bordeaux F2K, Helio Bordeaux BL, Bordeaux 10B, bon maroon light, bon maroon medium, eosin lake, Rhodamine lake B, Rhodamine lake Y, alizarin lake, thioindigo red B, thioindigo maroon, oil red, quinacridone red, pyrazolone red, polyazo red, chrome vermilion, benzidine orange, Perinone orange, oil orange, cobalt blue, cerulean blue, alkali blue lake, Peacock blue lake, Victoria blue lake, non-metal phthalocyanine blue, phthalocyanine blue, Fast sky blue, Indanthrene Blue (RS, BC), indigo, ultramarine, Prussian blue, anthraquinone blue, Fast violet B, methyl violet lake, cobalt violet, manganese violet, dioxane violet, anthraquinone violet, chromium green, zinc green, chromium oxide, viridian, Emerald green, Pigment green B, naphthol green B, green gold, acid green lake, Malachite green lake, phthalocyanine green, anthraquinone green, titanium oxide, zinc white, and Lithopone. These may be used singly or in combinations of two or more.

The content of the colorant can be properly selected according to the purpose without limitation. The content is preferably 1 part by mass to 15 parts by mass, and more preferably 3 parts by mass to 10 parts by mass based on 100 parts by mass of the toner.

The colorant can be used as a composite masterbatch with a resin.

Examples of the resin used in the production of the masterbatch or kneaded with the masterbatch include the non-crystalline polyester resin, styrenes such as polystyrene, poly(p-chlorostyrene), and polyvinyltoluene, or substituted polymers thereof; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-chloromethyl methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, and styrene-maleic acid ester copolymers; polymethyl methacrylate, polybutyl methacrylate, polyvinyl chloride, polyvinyl acetate, polyethylene, polypropylene, epoxy resins, epoxy polyol resins, polyurethane, polyamide, polyvinyl butyral, polyacrylic acid resins, rosin, modified rosin, terpene resins, aliphatic or alicyclic hydrocarbon resins, and aromatic petroleum resin. These may be used singly or in combinations of two or more.

The masterbatch can be prepared by mixing and kneading a resin for the masterbatch with the colorant under a high shear force. At this time, an organic solvent can be used to enhance the interaction of the colorant with the resin for the masterbatch. In the so-called flushing process, an aqueous paste containing a colorant water is mixed and kneaded with the resin and an organic solvent to transfer the colorant to the resin and remove the moisture content and the organic solvent component. This flushing process is preferably used because a wet cake of the colorant can be used as it is without drying. A high shear dispersing apparatus such as a three-roll mill is preferably used for mixing and kneading.

<Other Components>

Any other components can be properly selected according to the purpose without limitation. Examples thereof include a mold release agent, a charge controller, an external additive, a fluidity improver, a cleaning improving agent, and a magnetic material.

—Mold Release Agent—

Any mold release agent can be properly selected according to the purpose without limitation. Waxes are preferred.

Any wax can be properly selected according to the purpose without limitation. Examples thereof include natural waxes, synthetic waxes, and other waxes.

Examples of the natural waxes include plant waxes such as carnauba wax, cotton wax, Japan wax, and rice wax; animal waxes such as beeswax and lanolin; mineral waxes such as ozokerite and ceresin; and petroleum waxes such as paraffin, microcrystalline wax, and petrolatum.

Examples of the synthetic waxes include synthetic hydrocarbon waxes such as Fischer-Tropsch wax, polyethylene, and polypropylene; oil/fat synthetic waxes such as ester, ketone, and ether; and hydrogenated waxes.

Examples of the other waxes include fatty acid amide compounds such as 12-hydroxystearamide, stearamide, phthalic anhydride imide, and chlorinated hydrocarbon; homopolymers or copolymers of polyacrylates such as poly-n-stearyl methacrylate and poly-n-lauryl methacrylate which are low molecular weight crystalline polymer resins (such as copolymers of n-stearyl acrylate-ethyl methacrylate), and crystalline polymer resins having a long alkyl group in the side chain. These mold release agents may be used singly or in combinations of two or more. Among these, hydrocarbon waxes such as paraffin wax, microcrystalline wax, Fischer-Tropsch wax, polyethylene wax, and polypropylene wax are preferred.

The melting point of the mold release agent can be properly selected according to the purpose without limitation. The melting point is preferably 60° C. to 80° C. At a melting point less than 60° C., the mold release agent may melt at a low temperature, leading to poor heat-resistant preservation properties. At a melting point more than 80° C., even if the resin is melted in a fixing temperature range, the mold release agent may not melt sufficiently to cause high temperature off-set in the fixing, leading to deficits in an image.

The content of the mold release agent can be properly selected according to the purpose without limitation. The content is preferably 2 parts by mass to 10 parts by mass, and more preferably 3 parts by mass to 8 parts by mass based on 100 parts by mass of the toner. At a content less than 2 parts by mass, high temperature off-set resistance and low temperature fixing properties may reduce in the fixing. At a content more than 10 parts by mass, heat-resistant preservation properties may reduce or fogging of an image may be caused. A content within the more preferable range is advantageous in improvement in image quality and fixing stability.

—Charge Controller—

Any charge controller can be properly selected according to the purpose without limitation. Examples thereof include nigrosine dyes, triphenylmethane dyes, chromium-containing metal complex dyes, molybdic acid chelate pigments, Rhodamine dyes, alkoxy amines, quaternary ammonium salts (including fluorine-modified quaternary ammonium salts), alkylamides, a single element or compound of phosphorus, a single element or compound of tungsten, fluorine-containing activating agents, salicylic acid metal salts, and metal salts of salicylic acid derivatives.

The charge controller can be commercially available products. Examples of the commercially available products include a nigrosine dye BONTRON 03, a quaternary ammonium salt BONTRON P-51, a metal-containing azo dye BONTRON S-34, an oxynaphthoic acid metal complex E-82, a salicylic acid metal complex E-84, and a phenol condensate E-89 (made by ORIENT CHEMICAL INDUSTRIES CO., LTD.), quaternary ammonium salt molybdenum complexes TP-302 and TP-415 (made by HODOGAYA CHEMICAL CO., LTD.), LRA-901 and a boron complex LR-147 (made by Japan Carlit Co., Ltd.), copper phthalocyanine, perylene, quinacridone, azo pigments, and polymer compounds having a functional group such as a sulfonic acid group, a carboxyl group, and a quaternary ammonium salt. These may be used singly or in combinations of two or more.

The charge controller can be melt kneaded with the masterbatch and the resin, and dissolved and dispersed. The charge controller may be added directly to an organic solvent in the dissolution or dispersion, or may be externally added to the toner surface after a toner base particle is produced.

The content of the charge controller can be properly selected according to the purpose without limitation. The content is preferably 0.1 parts by mass to 10 parts by mass, and more preferably 0.2 parts by mass to 5 parts by mass based on 100 parts by mass of the toner. At a content more than 10 parts by mass, the charging properties of the toner may excessively increase to reduce the effect of the main charge controller. This may increase an electrostatic attractive force for a developing roller to reduce the fluidity of a developer and image density.

—External Additive—

For the external additive, oxide fine particles, inorganic fine particles, and hydrophobized inorganic fine particles can be used in combination. The average particle size of the primary particle of the hydrophobized inorganic fine particle is preferably 1 nm to 100 nm, and more preferably 5 nm to 70 nm.

Preferably, the external additive contains at least one hydrophobized inorganic fine particle having a primary particle having an average particle size of 20 nm or more, and contains at least one inorganic fine particle having an average particle size of 30 nm or more. The specific surface area, which is measured by the BET method, can be properly selected according to the purpose without limitation. The specific surface area is preferably 20 m$^2$/g to 500 m$^2$/g.

Any external additive can be properly selected according to the purpose without limitation. Examples thereof include silica fine particles, hydrophobic silica, fatty acid metal salts (such as zinc stearate and aluminum stearate), metal oxides (such as titania, alumina, tin oxide, and antimony oxide), and fluoropolymers. These may be used singly or in combinations of two or more.

Examples of the external additive include silica fine particles, hydrophobized silica fine particles, titania fine particles, hydrophobized titanium oxide fine particles, and alumina fine particles.

For the silica fine particles, commercially available products can be used. Examples of the commercially available products include R972, R974, RX200, RY200, R202, R805, and R812 (made by Nippon Aerosil Co., Ltd.).

For the titania fine particle, commercially available products can be used. Examples of the commercially available products include P-25 (made by Nippon Aerosil Co., Ltd.), STT-30 and STT-65C-S (made by Titan Kogyo, Ltd.), TAF-140 (made by Fuji Titanium Industry Co., Ltd.), and MT-150W, MT-500B, MT-600B, and MT-150A (made by Tayca Corporation).

For the hydrophobized titanium oxide fine particle, commercially available products can be used. Examples of the commercially available products include T-805 (made by Nippon Aerosil Co., Ltd.), STT-30A and STT-65S-S (made by Titan Kogyo, Ltd.), TAF-500T and TAF-1500T (made by Fuji Titanium Industry Co., Ltd.), MT-100S, MT-100T (made by Tayca Corporation), and IT-S (made by Ishihara Sangyo Kaisha, Ltd.).

The hydrophobized oxide fine particles, the hydrophobized silica fine particles, the hydrophobized titania fine particles, and the hydrophobized alumina fine particles can be prepared by treating a hydrophilic fine particle with a silane coupling agent such as a methyltrimethoxysilane, methyltriethoxysilane, and octyltrimethoxysilane, for example.

Silicone oil-treated inorganic fine particles prepared by heating silicone oil when necessary and treating an inorganic fine particle with the silicone oil are also suitable.

Examples of the silicone oil include dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and α-methylstyrene-modified silicone oil.

Examples of the inorganic fine particles include silica, alumina, titanium oxide, barium titanate, magnesium titanate, calcium titanate, strontium titanate, iron oxide, copper oxide, zinc oxide, tin oxide, quartz sand, clay, mica, wollastonite, diatomite, chromium oxide, cerium oxide, red iron oxide, antimony trioxide, magnesium oxide, zirconium oxide, barium sulfate, barium carbonate, calcium carbonate, silicon carbide, and silicon nitride. These may be used singly or in combinations of two or more. Among these, silica and titanium dioxide are particularly preferred.

The content of the external additive can be properly selected according to the purpose without limitation. The content is preferably 0.1 parts by mass to 5 parts by mass, and more preferably 0.3 parts by mass to 3 parts by mass based on 100 parts by mass of the toner.

The average particle size of the primary particle in the inorganic fine particle can be properly selected according to the purpose without limitation. The average particle size is preferably 100 nm or less, and more preferably 3 nm to 70 nm. At an average particle size less than 3 nm, the inorganic fine particle may be buried in the toner to prevent the function of the particle from being effectively exhibited. At an average particle size more than 100 nm, the surface of a photoconductor may be damaged unevenly.

—Fluidity Improver—

Any fluidity improver which is surface treated to enhance hydrophobicity and prevent reduction in rheological properties and charging properties even under a high humidity can be properly selected according to the purpose without limitation. Examples thereof include silane coupling agents, silylating agents, silane coupling agents having a fluorinated alkyl group, organic titanate coupling agents, aluminum coupling agents, silicone oils, and modified silicone oils. Particularly preferably, the silica and the titanium oxide as the external additive are used as hydrophobic silica and hydrophobic titanium oxide, respectively, by surface treatment with the fluidity improver.

—Cleaning Improving Agent—

Any cleaning improving agent added to the toner to remove the toner remaining on a photoconductor and an intermediate transfer member after transfer can be properly selected according to the purpose without limitation. Examples thereof include fatty acid metal salts such as zinc stearate, calcium stearate, and aluminum stearate; and polymer fine particles produced by soap-free emulsion polymerization such as polymethyl methacrylate fine particles and polystyrene fine particles. The polymer fine particle preferably has a relatively narrow particle size distribution. The volume average particle size is more preferably 0.01 μm to 1 μm.

—Magnetic Material—

Any magnetic material can be properly selected according to the purpose without limitation. Examples thereof include iron powder, magnetite, and ferrite. Among these, white magnetic materials are preferred for the color tone.

<Method for Producing Toner>

Any method for producing a toner can be properly selected according to the purpose without limitation. A preferred method is a method of granulation by dispersing an oil phase in an aqueous medium wherein the oil phase includes the copolymerization resin, preferably a crystalline resin other than the copolymerization resin, and the colorant, and further includes other components such as the mold release agent when necessary. Suitable examples of the method for producing a toner include a dissolution suspension method.

In the dissolution suspension method, preparation of an aqueous medium, preparation of an oil phase containing toner materials, emulsification or dispersion of the toner materials, and removal of an organic solvent are preferably performed.

—Preparation of Aqueous Medium (Aqueous Phase)—

The aqueous medium can be prepared by dispersing resin particles in an aqueous medium, for example. The amount of the resin particle added to the aqueous medium can be properly selected according to the purpose without limitation. The amount is preferably 0.5 parts by mass to 10 parts by mass based on 100 parts by mass of the aqueous medium.

Any aqueous medium can be properly selected according to the purpose without limitation. Examples of the aqueous medium include water, solvents compatible with water, and mixtures thereof. These may be used singly or in combinations of two or more. Among these, water is preferred.

Any solvent compatible with water can be properly selected according to the purpose without limitation. Examples thereof include alcohol, dimethylformamide, tetrahydrofuran, cellosolves, and lower ketones. Any alcohol can be properly selected according to the purpose without limitation. Examples thereof include methanol, isopropanol, and ethylene glycol. Any lower ketone can be properly selected according to the purpose without limitation. Examples thereof include acetone and methyl ethyl ketone.

—Preparation of Oil Phase—

The oil phase containing the toner materials can be prepared by dissolving or dispersing toner materials in an organic solvent wherein the toner materials include the copolymerization resin, preferably a crystalline resin other than the copolymerization resin, and the colorant, and further include other components such as the mold release agent when necessary.

Any organic solvent can be properly selected according to the purpose without limitation. Organic solvents having a boiling point less than 150° C. are preferred because these are easy to remove.

Any organic solvent having a boiling point less than 150° C. can be properly selected according to the purpose without limitation. Examples thereof include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These may be used singly or in combinations of two or more.

Among these, ethyl acetate, toluene, xylene, benzene, methylene chloride, 1,2-dichloroethane, chloroform, and carbon tetrachloride are preferable, and ethyl acetate is more preferable.

—Emulsification or Dispersion—

The toner materials can be emulsified or dispersed by dispersing the oil phase containing the toner materials in the aqueous medium.

Any method for forming the dispersion liquid stably in the aqueous medium can be properly selected according to the purpose without limitation. Examples thereof include a method in which an oil phase prepared by dissolving or dispersing toner materials in a solvent is added to an aqueous medium phase, and dispersed by a shear force.

For the dispersion, any dispersing machine can be properly selected according to the purpose without limitation. Examples thereof include a low-speed shear dispersing machine, a high-speed shear dispersing machine, a friction dispersing machine, a high pressure jet dispersing machine, and an ultrasonic dispersing machine. Among these, the high-speed shear dispersing machine is preferred because the dispersion (oil droplets) can be controlled to have a particle size of 2 μm to 20 μm.

When the high-speed shear dispersing machine is used, conditions such as the number of rotation, the dispersion time, and the dispersion temperature can be properly selected according to the purpose without limitation.

The number of rotation can be properly selected according to the purpose without limitation. The number of rotation is preferably 1,000 rpm to 30,000 rpm, and more preferably 5,000 rpm to 20,000 rpm.

The dispersion time can be properly selected according to the purpose without limitation. In a batch method, the dispersion time is preferably 0.1 minutes to 5 minutes.

The dispersion temperature can be properly selected according to the purpose without limitation. Under increased pressure, the dispersion temperature is preferably 0° C. to 150° C., and more preferably 40° C. to 98° C. Usually, a higher dispersion temperature facilitates dispersion.

The amount of the aqueous medium used in emulsification or dispersion of the toner materials can be properly selected according to the purpose without limitation. The amount is preferably 50 parts by mass to 2,000 parts by mass, and more preferably 100 parts by mass to 1,000 parts by mass based on 100 parts by mass of the toner materials.

At an amount of the aqueous medium used less than 50 parts by mass, the dispersion state of the toner materials may be bad to prevent a toner base particle from having a predetermined particle size. At an amount more than 2,000 parts by mass, production cost may increase.

In emulsification or dispersion of the oil phase containing the toner materials, a dispersant is preferably used from the viewpoint of stabilizing the dispersion such as oil droplets into a desired shape and providing a sharp particle size distribution.

Any dispersant can be properly selected according to the purpose without limitation. Examples thereof include surfactants, poorly water-soluble inorganic compound dispersants, and polymer-based protection colloids. These may be used singly or in combinations of two or more. Among these, surfactants are particularly preferred.

Examples of the surfactant include anionic surfactants, cationic surfactants, nonionic surfactants, and amphoteric surfactants.

Examples of the anionic surfactants include alkylbenzene sulfonic acid salts, a-olefin sulfonic acid salts, phosphoric acid esters, and anionic surfactants having a fluoroalkyl group. Among these, anionic surfactants having a fluoroalkyl group are preferred. Examples of the anionic surfactants having a fluoroalkyl group include fluoroalkylcarboxylic acid having 2 to 10 carbon atoms or metal salts thereof, disodium perfluorooctanesulfonylglutamate, sodium 3-[omega-fluoroalkyl(6 to 11 carbon atoms)oxy]-1-alkyl(3 to 4 carbon atoms)sulfonate, sodium 3-[omega-fluoroalkanoyl(6 to 8 carbon atoms)-N-ethylamino]-1-propanesulfonate, fluoroalkyl(11 to 20 carbon atoms)carboxylic acid or metal salts thereof, perfluoroalkylcarboxylic acid (7 to 13 carbon atoms) or metal salts thereof, perfluoroalkyl(4 to 12 carbon atoms)sulfonic acid or metal salts thereof, perfluorooctanesulfonic acid diethanolamide, N-propyl-N-(2-hydroxyethyl)perfluorooctanesulfoneamide, perfluoroalkyl(6 to 10 carbon atoms)sulfoneamidepropyltrimethylammonium salts, perfluoroalkyl(6 to 10 carbon atoms)-N-ethylsulfonyl glycine salts, and monoperfluoroalkyl(6 to 16 carbon atoms)ethylphosphoric acid esters. These may be used singly or in combinations of two or more.

For the surfactant having a fluoroalkyl group, commercially available products can be used. Examples of the commercially available products include SURFLON S-111, S-112, and S-113 (made by ASAHI GLASS CO., LTD.); FLUORAD FC-93, FC-95, FC-98, and FC-129 (made by Sumitomo 3M Limited); UNIDYNE DS-101 and DS-102 (made by DAIKIN INDUSTRIES, LTD.); MEGAFACE F-110, F-120, F-113, F-191, F-812, and F-833 (made by DIC Corporation); EFTOP EF-102, 103, 104, 105, 112, 123A, 123B, 306A, 501, 201, and 204 (made by Mitsubishi Materials Electronic Chemicals Co., Ltd.); and FTERGENT F-100 and F150 (made by Neos Company Limited). These may be used singly or in combinations of two or more.

Examples of the cationic surfactants include amine salt surfactants, quaternary ammonium salt cationic surfactants, and cationic surfactants having a fluoroalkyl group. Examples of the amine salt surfactant include alkylamine salts, amino alcohol fatty acid derivatives, polyamine fatty acid derivatives, and imidazoline. Examples of the quaternary ammonium salt cationic surfactants include alkyltrimethylammonium salts, dialkyldimethylammonium salts, alkyldimethylbenzylammonium salts, pyridinium salts, alkylisoquinolinium salts, and benzethonium chloride. Examples of the cationic surfactants having a fluoroalkyl group include aliphatic primary, secondary or tertiary amine acids having a fluoroalkyl group, aliphatic quaternary ammonium salts such as perfluoroalkyl(6 to 10 carbon atoms)sulfoneamidepropyltrimethyl ammonium salts, benzalkonium salts, benzethonium chloride, pyridinium salts, and imidazolinium salts. These may be used singly or in combinations of two or more.

For the cationic surfactant, commercially available products can be used. Examples of the commercially available products include SURFLON S-121 (made by ASAHI GLASS CO., LTD.); FLUORAD FC-135 (made by Sumitomo 3M Limited); UNIDYNE DS-202 (made by DAIKIN INDUSTRIES, LTD.), MEGAFACE F-150 and F-824 (made by DIC Corporation); EFTOP EF-132 (made by Tohkem Products Corp.); and FTERGENT F-300 (made by Neos Company Limited). These may be used singly or in combinations of two or more.

Examples of the nonionic surfactants include fatty acid amide derivatives and polyhydric alcohol derivatives.

Examples of the amphoteric surfactants include alanine, dodecyl di(aminoethyl)glycine, di(octylaminoethyl)glycine, and N-alkyl-N,N-dimethylammonium betaine.

—Removal of Organic Solvent—

Any method for removing an organic solvent from a dispersion liquid such as an emulsified slurry can be properly selected according to the purpose without limitation. Examples thereof include a method for raising the temperature of the whole reaction system gradually to evaporate the organic solvent in oil droplets, and a method for spraying a dispersion liquid in a dry atmosphere to remove an organic solvent in oil droplets.

When the organic solvent is removed, a toner base particle is formed. The toner base particle can be washed, dried, and so on, and can further be classified and so on. The classification may be performed by removing fine particle portions in a solution with a cyclone, a decanter, or a centrifuge, or a classification operation may be performed after drying.

The prepared toner base particle may be mixed with particles such as the external additive and the charge controller. At this time, a mechanical impact force can be applied to suppress separation of the particles such as the external additive from the surface of the toner base particle.

Any method for applying the mechanical impact force can be properly selected according to the purpose without limitation. Examples thereof include a method for applying an impact force to a mixture with a high-speed rotating blade, and a method for charging a mixture in a high-speed stream and accelerating the stream to collide particles each other or particles against a proper collision plate.

Any apparatus used for the method can be properly selected according to the purpose without limitation. Examples of the apparatus include an ANGMILL (made by Hosokawa Micron Corporation), a modified apparatus of an I type mill (made by Nippon Pneumatic Mfg. Co., Ltd.)

having reduced air pressure for milling, a hybridization system (made by Nara Machinery Co., Ltd.), a KRYPTRON system (made by Kawasaki Heavy Industries, Ltd.), and an automatic mortar.

The shape, size, and the like of the toner according to the present invention can be properly selected according to the purpose without limitation. The volume average particle size of the toner can be properly selected according to the purpose without limitation. The volume average particle size is preferably 3 μm to 7 μm. The ratio (Dv/Dn) of the volume average particle size Dv to the number average particle size Dn of the toner is preferably 1.2 or less. Preferably The toner further contains particles having a particle size of 2 μm or less at a number percentage of 1 to 10.

The coloring of the toner can be properly selected according to the purpose without limitation. At least one can be selected from a black toner, a cyan toner, a magenta toner, and a yellow toner. The toners of the respective colors can be attained by properly selecting the kind of the colorant.

<<Methods for Calculating and Analyzing Various Properties of Toner and Toner Components>>

The glass transition temperatures Tg, acid values, hydroxyl values, molecular weights, and melting points of the copolymerization resin and the crystalline resin other than the copolymerization resin can be properly selected according to the purpose without limitation. These properties themselves may be measured, or components may be separated from the actual toner with gel permeation chromatography (GPC) or the like, and the respective components may be analyzed by the method described later to calculate the glass transition temperature Tg, the acid value, the hydroxyl value, the molecular weight, and the melting point.

The respective components can be separated by GPC according to the following method, for example.

In the GPC measurement using THF (tetrahydrofuran) as a mobile phase, an eluate is fractionated with a fraction collector or the like to collect fractions corresponding to portions having a desired molecular weight in the total area of the elution curve.

After the collected eluate is condensed with an evaporator or the like and dried, the solid content is dissolved in a heavy solvent such as deuterochloroform or deuterated THF and measured by $^1$H-NMR. From the ratio of the integrations of the respective elements, the ratio of the monomers constituting the resin in the eluted components can be calculated.

Alternatively, after the eluate is condensed, the eluate is hydrolyzed with sodium hydroxide or the like. The decomposed product is subjected to a qualitative and quantitative analysis by high performance liquid chromatography (HPLC) to calculate the ratio of the monomer constituting the resin.

<<Unit for Separating Toner Components>>

An exemplary unit for separating the respective components in the analysis of the toner will be shown below.

First, 1 g of the toner is placed in 100 mL of tetrahydrofuran (THF), and stirred for 30 minutes under a condition of 25° C. The soluble content is dissolved to obtain a dissolution solution.

The dissolution solution is filtered through a membrane filter having an opening of 0.2 μm to obtain a THF-soluble content in the toner.

The THF-soluble content is then dissolved in THF to prepare a sample for GPC measurement. The sample is injected to the GPC used for measurement of the molecular weight of the resins described above.

The fraction collector is disposed at an eluate discharge port in the GPC to fractionate the eluate at a predetermined count. The eluate is collected from the beginning of elution in the elution curve (rising in the curve) every 5% of the area percentage.

Then, 30 mg of the sample is dissolved in 1 mL of deuterochloroform for each fraction of the eluate, and 0.05% by volume of tetramethylsilane (TMS) as a reference substance is added.

The solution is placed in a glass tube for NMR measurement having a diameter of 5 mm. Using a nuclear magnetic resonance apparatus (made by JEOL Ltd., JNM-AL400), integration is performed 128 times under a temperature of 23° C. to 25° C. to obtain a spectrum.

From the ratio of the peak integration in the obtained spectrum, the monomer composition such as the copolymerization resin and the crystalline resin other than the copolymerization resin contained in the toner and the constitution ratio thereof can be determined.

From these results, for example, the extracted product recovered in a fraction in which the crystalline polyester resin accounts for 90% or more can be considered as the crystalline polyester resin. Similarly, an extracted product recovered in a fraction in which the resin having a polyhydroxycarboxylic acid skeleton accounts for 90% or more can be considered as the resin having a polyhydroxycarboxylic acid skeleton. Similarly, an extracted product recovered in a fraction in which the crystalline resin accounts for 90% or more can be considered as the crystalline resin.

The toner according to the present invention causes no filming, and has excellent properties such as excellent low temperature fixing properties, high temperature off-set resistance, and heat-resistant preservation properties. For this reason, the toner according to the present invention can be suitably used in a variety of fields, and can be more suitably used in image formation by electrophotography. The toner can be suitably used for the developer according to the present invention, the toner-accommodating container used in the present invention, the process cartridge used in the present invention, the image forming apparatus according to the present invention, and the image forming method used in the present invention.

(Developer)

The developer according to the present invention includes the toner according to the present invention and other components such as a carrier, which are properly selected when necessary.

For this reason, the developer has excellent transfer properties, charging properties, and the like to form a high quality image stably. The developer may be one-component developer or two-component developer. For use in a high speed printer or the like for a higher information processing rate these days, the two-component developer is preferred because of the increased life.

For use of the developer as the one-component developer, the particle size of the toner barely changes even if the toner is balanced. The filming of the toner to the developing roller, and fusing of the toner to a member for spreading the toner such as a blade are reduced to attain good and stable developability and images when the developer is stirred for a long time in a developing apparatus.

For use of the developer as the two-component developer, the particle size of the toner barely changes even if the toner is balanced for a long time. Good and stable developability and images are attained even if the developer is stirred for a long time in a developing apparatus.

<Carrier>

Any carrier can be properly selected according to the purpose without limitation. Preferably, the carrier includes a core material and a resin layer with which the core material is coated.

—Core Material—

The material for the core material can be properly selected according to the purpose without limitation. Examples of the material include manganese-strontium materials of 50 emu/g to 90 emu/g, and manganese-magnesium materials of 50 emu/g to 90 emu/g. To ensure the image density, highly magnetized materials such as an iron powder of 100 emu/g or more and magnetite of 75 emu/g to 120 emu/g are preferably used. Slightly magnetized materials such as copper-zinc materials of 30 emu/g to 80 emu/g are preferred because these materials can relax an impact of a napped developer to the photoconductor and advantageously enhance the image quality. These may be used singly or in combinations of two or more.

The volume average particle size of the core material can be properly selected according to the purpose without limitation. The volume average particle size is preferably 10 μm to 150 μm, and more preferably 40 μm to 100 μm. At a volume average particle size less than 10 μm, a large amount of fine powders may exist in the carrier to reduce magnetization per particle to scatter the carrier. At a volume average particle size more than 150 μm, the specific surface area may reduce to scatter the toner. In a full-color image having a large area of solid portions, especially the solid portions may be poorly reproduced.

When the toner is used for the two-component developer, the toner may be mixed with the carrier.

The content of the carrier in the two-component developer can be properly selected according to the purpose without limitation. The content is preferably 90 parts by mass to 98 parts by mass, and more preferably 93 parts by mass to 97 parts by mass based on 100 parts by mass of the two-component developer.

<Toner-Accommodating Container>

The toner-accommodating container used in the present invention accommodates the toner or the developer according to the present invention.

Any known container can be properly selected without limitation. Suitable examples thereof include containers including a toner-accommodating container main body and a cap.

The size, shape, structure, material, and the like of the toner-accommodating container main body can be properly selected according to the purpose without limitation. For example, the shape is preferably cylindrical. Particularly preferably, the container main body has an inner circumferential surface having depressions and projections in a spiral form to enable the accommodated toner to move toward the outlet port by the rotation of the container, and has part or all of the spiral portions having an accordion function.

Any material for the toner accommodating container main body can be used without limitation. The material having high dimensional accuracy is preferable. Suitable examples of the material include resins. Among these, polyester resins, polyethylene resins, polypropylene resins, polystyrene resins, polyvinyl chloride resins, polyacrylic acid, polycarbonate resins, ABS resins, and polyacetal resins are suitable.

The toner-accommodating container is easy to preserve, transport, and so on and very easy to handle, and can be detachably mounted on a process cartridge or an image forming apparatus according to the present invention described later to feed the toner suitably.

<Process Cartridge>

The process cartridge used in the present invention includes at least an electrostatic latent image bearing member configured to bear an electrostatic latent image, and a developing unit configured to develop the electrostatic latent image carried on the electrostatic latent image bearing member with the toner to form a visible image, and further includes other units properly selected when necessary.

The developing unit includes at least a developer container accommodating the toner or the developer according to the present invention, and a developer carrier carrying and conveying the toner or developer accommodated in the developer container, and further may include a layer thickness regulating member regulating the thickness of the layer of the tone carried.

The other units can be properly selected according to the purpose without limitation. Suitable examples thereof include a charging unit and a cleaning unit described later.

The process cartridge can be detachably mounted on a variety of image forming apparatuses, and is preferably detachably mounted on the image forming apparatus according to the present invention described later.

(Image Forming Method and Image Forming Apparatus)

The image forming method used in the present invention includes at least an electrostatic latent image forming step, a developing step, a transferring step, and a fixing step, and further includes other steps properly selected when necessary such as a discharging step, a cleaning step, a recycling step, and a control step.

The image forming apparatus according to the present invention includes at least an electrostatic latent image bearing member, an electrostatic latent image forming unit, a developing unit, a transferring unit, and a fixing unit, and further includes other units properly selected when necessary such as a discharging unit, a cleaning unit, a recycling unit, and a control unit.

<Electrostatic Latent Image Forming Step and Electrostatic Latent Image Forming Unit>

The electrostatic latent image forming step is a step of forming an electrostatic latent image on an electrostatic latent image bearing member.

Any known material, shape, structure, size, and the like of the electrostatic latent image bearing member (referred to as an "electrophotographic photoconductor," "photoconductor," or "image bearing member" in some cases) can be properly selected without limitation. Examples of the shape include a drum shape. Examples of the material include inorganic photoconductor materials such as amorphous silicon and selenium, polysilane, and organic photoconductor (OPC) materials such as phthalopolymethine.

The electrostatic latent image can be formed by the electrostatic latent image forming unit, for example, by uniformly charging the surface of the electrostatic latent image bearing member, and exposing the surface according to the image.

The electrostatic latent image forming unit includes at least, for example, a charging device uniformly charging the surface of the electrostatic latent image bearing member and an exposing unit exposing the surface of the electrostatic latent image bearing member according to the image.

The charging can be performed by the charging device, for example, by applying voltage to the surface of the electrostatic latent image bearing member.

Any charging device can be properly selected according to the purpose without limitation. Examples thereof include known contact charging devices including a conductive or semiconductive roll, a brush, a film, or a rubber blade, and non-contact charging devices using corona discharge such as a corotron and a scorotron.

Preferably, the charging device is disposed in contact or non-contact with the electrostatic latent image bearing member to charge the surface of the electrostatic latent image bearing member by superimposing DC and AC voltages.

Preferably, the charging device is a charging roller disposed adjacent to but not contacted with the electrostatic latent image bearing member with a gap tape being interposed therebetween to charge the surface of the electrostatic latent image bearing member by superimposing DC and AC voltages to the charging roller.

The exposure can be performed by the exposing device, for example, by exposing the surface of the electrostatic latent image bearing member according to the image.

Any exposing device enabling exposure of the surface of the electrostatic latent image bearing member charged by the charging device according to the image formed can be properly selected according to the purpose without limitation. Examples thereof include a variety of exposing devices such as copy optical exposing devices, rod lens array exposing devices, laser optical exposing devices, and liquid crystal shutter optical exposing devices.

In the present invention, a back exposure type device allowing exposure from the rear surface of the electrostatic latent image bearing member according to the image may be used.

<Developing Step and Developing Unit>

The developing step is a step of developing the electrostatic latent image with the toner according to the present invention to form a visible image.

The visible image can be formed by the developing unit by developing the electrostatic latent image with the toner according to the present invention, for example.

Any known developing unit enabling development with the toner according to the present invention, for example, can be properly selected without limitation. Suitable examples thereof include a developing unit containing at least a developing device accommodating the toner or developer according to the present invention to feed the developer to the electrostatic latent image in a contacting or non-contacting manner.

The developing device may be of a dry developing type or a wet developing type, or may be a monochrome developing device or a multi-color developing device. Examples thereof include those having a stirrer which friction stirs the developer for charging and a rotatable magnet roller.

Inside of the developing device, for example, the toner is mixed with the carrier by stirring. At this time, the toner is charged by friction. The napped toner is held on the surface of the rotating magnet roller to form a magnetic brush. Since the magnetic roller is disposed in the vicinity of the electrostatic latent image bearing member, part of the toner constituting the magnetic brush formed on the surface of the magnet roller moves to the surface of the electrostatic latent image bearing member by an electric attractive force. As a result, the electrostatic latent image is developed with the toner to form a visible image by the toner on the surface of the electrostatic latent image bearing member.

<Transferring Step and Transferring Unit>

The transferring step is a step of transferring the visible image onto a recording medium. Preferably, the transferring step is a step of primarily transferring the visible image onto the intermediate transfer member with an intermediate transfer member, and secondarily transferring the visible image onto the recording medium. More preferably, the transferring step includes a primary transferring step of transferring the visible image onto an intermediate transfer member with the toners of two or more colors, preferably full-color toners to form a composite transfer image, and a secondary transferring step of transferring the composite transfer image onto a recording medium.

The transfer of the visible image can be performed by the transferring unit, for example, by charging the electrostatic latent image bearing member with a transfer charging device. Preferably, the transferring unit includes a primary transferring unit configured to transfer the visible image onto an intermediate transfer member to form a composite transfer image, and a secondary transferring unit configured to transfer the composite transfer image onto a recording medium.

Any known intermediate transfer member can be properly selected according to the purpose without limitation. Examples thereof include a transfer belt.

Preferably, the transferring unit (the primary transferring unit and the secondary transferring unit) includes at least a transferring device charging off the visible image formed on the electrostatic latent image bearing member to transfer the visible image onto the recording medium. One or two or more transferring units may be disposed.

Examples of the transferring device include a corona transferring device by corona discharge, a transfer belt, a transfer roller, a pressure transfer roller, and an adhesive transferring device.

Any recording medium can be used without limitation, and can be properly selected from known recording papers.

<Fixing Step and Fixing Unit>

The fixing step is a step of fixing the visible image transferred onto the recording medium by a fixing unit. The fixing step may be performed every time when the toner of each color is transferred onto the recording medium, or may be performed at once in the state where the toners of the respective colors are layered.

Any fixing unit can be properly selected according to the purpose without limitation. Known heating-pressure units are suitable. Examples of the heating-pressure unit include a combination of a heating roller with a pressure roller, and a combination of a heating roller with a pressure roller and an endless belt.

Preferably, the fixing unit includes a heating body having a heater, a film contacting the heating body, and a pressure member pressed against the heating body with the film being interposed therebetween, in which a recording medium having an unfixed image formed is passed between the film and the pressure member to fix the image by heating. In the heating-pressure unit, a preferred heating temperature is usually 80° C. to 200° C.

<Other Steps and Other Units>

—Discharging Step and Discharging Unit—

The discharging step is a step of applying discharge bias to the electrostatic latent image bearing member to discharge the carrier, which can be suitably performed by a discharging unit.

Any discharging unit enabling application of discharge bias to the electrostatic latent image bearing member can be used without limitation, and can be properly selected from known discharging devices. Examples thereof include discharging lamps.

—Cleaning Step and Cleaning Unit—

The cleaning step is a step of removing the toner remaining on the electrostatic latent image bearing member, which can be suitably performed by a cleaning unit.

Any cleaning unit enabling removal of the electrophotographic toner remaining on the electrostatic latent image bearing member can be used without limitation, and can be properly selected from known cleaners. Examples thereof include magnetic brush cleaners, electrostatic brush cleaners, magnetic roller cleaners, blade cleaners, brush cleaners, and web cleaners.

—Recycling Step and Recycling Unit—

The recycling step is a step of recycling the toner removed in the cleaning step back to the developing unit, which can be suitably performed by a recycling unit.

Any recycling unit can be properly selected according to the purpose without limitation. Examples thereof include known conveying units.

—Control Step and Control Unit—

The control step is a step of controlling the respective steps, which can be suitably performed by a control unit.

Any control unit enabling control of the operation of the units can be properly selected according to the purpose without limitation. Examples thereof include apparatuses such as sequencers and computers.

As one aspect, the image forming method used in the present invention by the image forming apparatus according to the present invention will be described with reference to FIG. 1. An image forming apparatus 100 shown in FIG. 1 includes a photoconductor drum 10 as the electrostatic latent image bearing member (hereinafter referred to as a "photoconductor 10"), a charging roller 20 as the charging unit, an exposing apparatus 30 as the exposing unit, a developing apparatus 40 as the developing unit, an intermediate transfer member 50, a cleaning apparatus 60 as the cleaning unit having a cleaning blade, and a discharging lamp 70 as the discharging unit.

The intermediate transfer member 50 is an endless belt designed to be movable in the arrow direction in the drawing by three rollers 51 disposed inside of the endless belt to extend the belt which is laid over the rollers under tension. Part of the three rollers 51 also functions as a transfer bias roller that can apply a predetermined transfer bias (primary transfer bias) to the intermediate transfer member 50. In the vicinity of the intermediate transfer member 50, a cleaning blade 90 for the intermediate transfer member is disposed. A transfer roller 80 is disposed facing the intermediate transfer member 50. The transfer roller 80 is the transferring unit that can apply a transfer bias for transfer (secondary transfer) of a visible image (toner image) onto a recording medium 95. In the surrounding region of the intermediate transfer member 50, a corona charging device 58 for charging the visible image carried on the intermediate transfer member 50 is disposed between the contact portion of the electrostatic latent image bearing member 10 and the intermediate transfer member 50 and the contact portion of the intermediate transfer member 50 and the recording medium 95 in the rotational direction of the intermediate transfer member 50.

The developing apparatus 40 includes a developing belt 41 as a developer carrier, and a black developing unit 45K, a yellow developing unit 45Y, a magenta developing unit 45M, and a cyan developing unit 45C disposed around the developing belt 41. The black developing unit 45K includes a developer container 42K, a developer feeding roller 43K, and a developing roller 44K. The yellow developing unit 45Y includes a developer container 42Y, a developer feeding roller 43Y, and a developing roller 44Y. The magenta developing unit 45M includes a developer container 42M, a developer feeding roller 43M, and a developing roller 44M. The cyan developing unit 45C includes a developer container 42C, a developer feeding roller 43C, and a developing roller 44C. The developing belt 41 is an endless belt extended rotatably by a plurality of belt rollers. Part of the developing belt 41 contacts with the electrostatic latent image bearing member 10.

In the image forming apparatus 100 shown in FIG. 1, the charging roller 20 uniformly charges the photoconductor drum 10, for example. The exposing apparatus 30 exposes the surface of the photoconductor drum 10 according to an image to form an electrostatic latent image. The electrostatic latent image formed on the photoconductor drum 10 is developed with a toner fed from the developing apparatus 40 to form a visible image (toner image). The visible image (toner image) is transferred onto the intermediate transfer member 50 by the voltage applied by the roller 51 (primary transfer), and transferred onto the transfer paper 95 (secondary transfer). As a result, a transfer image is formed on the transfer paper 95. The toner remaining on the photoconductor 10 is removed by the cleaning apparatus 60, and the charge in the photoconductor 10 is discharged once by the discharging lamp 70.

Figure 2:
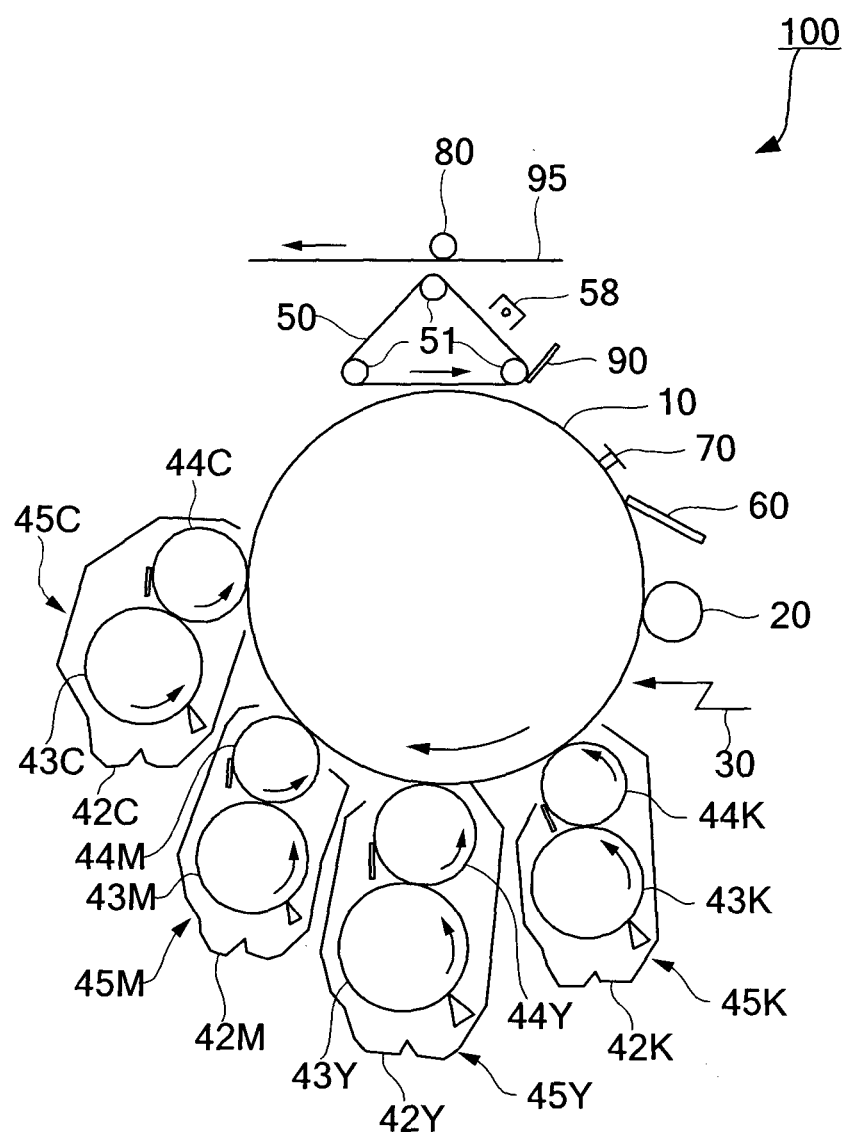
FIG. 2 is a schematic view showing another exemplary image forming apparatus according to the present invention.

As another aspect, the image forming method according to the present invention implemented by the image forming apparatus will be described with reference to FIG. 2. The image forming apparatus 100 shown in FIG. 2 has the same configuration as that of the image forming apparatus 100 shown in FIG. 1 except that without the developing belt 41 in the image forming apparatus 100 shown in FIG. 1, the black developing unit 45K, the yellow developing unit 45Y, the magenta developing unit 45M, and the cyan developing unit 45C are directly disposed around the photoconductor 10 facing one another, and has the same effect. In FIG. 2, same referential numerals are given to same components as those in FIG. 1.

Figure 3:
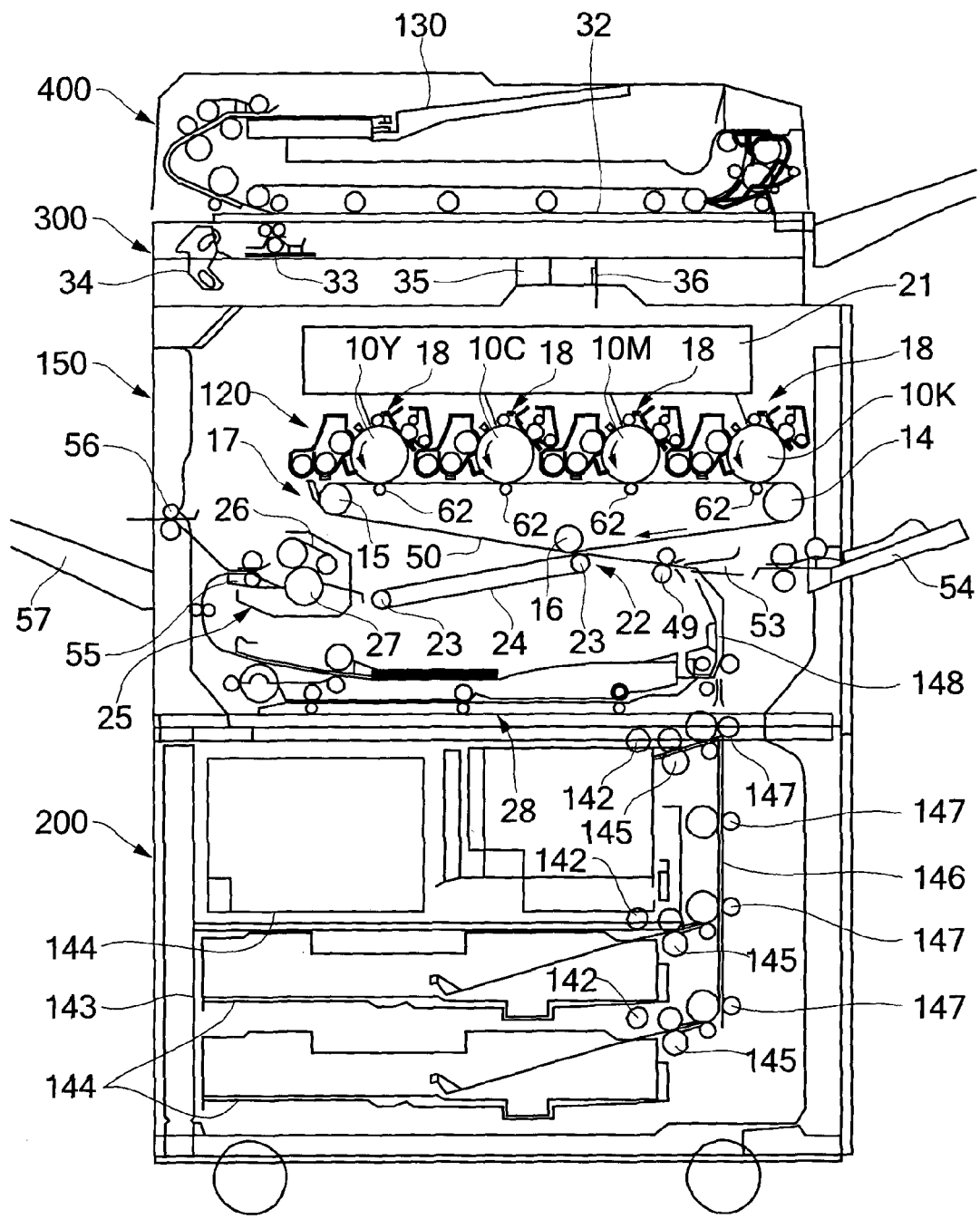
FIG. 3 is a schematic view showing an exemplary tandem color image forming apparatus according to the present invention.

As another aspect, the image forming method used in the present invention implemented by the image forming apparatus according to the present invention will be described with reference to FIG. 3. A tandem image forming apparatus shown in FIG. 3 is a tandem color image forming apparatus. The tandem image forming apparatus includes a copying apparatus main body 150, a paper feeding table 200, a scanner 300, and an automatic document feeder (ADF) 400.

The copying apparatus main body 150 has an endless belt-like intermediate transfer member 50 disposed in the center of the main body. The intermediate transfer member 50 is extended around support rollers 14, 15 and 16 rotatably clockwise in FIG. 3. In the vicinity of the support roller 15, an intermediate transfer member cleaning apparatus 17 for removing the remaining toner on the intermediate transfer member 50 is disposed. The intermediate transfer member 50 extended around the support roller 14 and the support roller 15 includes a tandem developing device 120 having four image forming units 18 of yellow, cyan, magenta, and black disposed in parallel in the conveying direction to face the intermediate transfer member 50. In the vicinity of the tandem developing device 120, an exposing apparatus 21 is disposed. The intermediate transfer member 50 has a secondary transfer apparatus 22 disposed on a side opposite the side on which the tandem developing device 120 is disposed. The secondary transfer apparatus 22 has an endless, secondary transfer belt 24 extended around a pair of rollers 23. The recording medium (transfer paper) conveyed on the secondary transfer belt 24 can contact with the intermediate transfer member 50. In the vicinity of the secondary transfer apparatus 22, a fixing apparatus 25 is disposed. The fixing apparatus 25 includes an endless, fixing belt 26, and a pressure roller 27 disposed to be pressed against the fixing belt 26.

The tandem image forming apparatus has a sheet flipping apparatus 28 disposed in the vicinity of the secondary transfer apparatus 22 and the fixing apparatus 25 to flip the transfer paper to form images on both surfaces of the transfer paper.

Next, full-color image formation (color copy) using the tandem developing device 120 will be described. First, a manuscript is set on a manuscript stand 130 in the automatic document feeder (ADF) 400. Alternatively, the automatic document feeder 400 is opened, the manuscript is set on a contact glass 32 in the scanner 300, and the automatic document feeder 400 is closed.

A start switch (not shown) is pressed. When the manuscript is set in the automatic document feeder 400, the manuscript is conveyed onto the contact glass 32, and then the scanner 300 is driven to run a first runner 33 and a second runner 34. When the manuscript is set on the contact glass 32, the scanner 300 is immediately driven to run a first runner 33 and a second runner 34. At this time, the manuscript is irradiated with light from a light source by the first runner 33, and the reflected light from the surface of the manuscript is reflected by a mirror in the second runner 34. The light reflected by the mirror is received through an imaging lens 35 by a reading sensor 36 to read a color manuscript (color image) and obtain black image information, yellow image information, magenta image information, and cyan image information.

Figure 4:
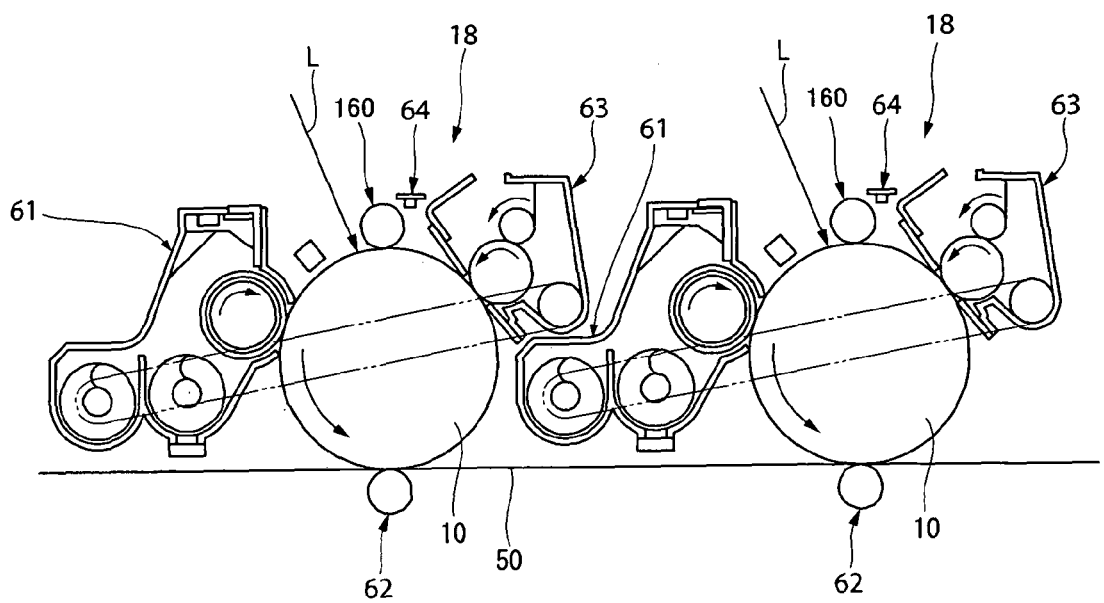
FIG. 4 is a schematic view showing the image forming apparatus in FIG. 3 which is partially enlarged.

The black image information, the yellow image information, the magenta image information, and the cyan image information are transmitted to the respective image forming units 18 (black image forming unit, yellow image forming unit, magenta image forming unit, and cyan image forming unit) in the tandem developing device 120 to form toner images of black, yellow, magenta, and cyan in the respective image forming units. As shown in FIG. 4, each image forming unit 18 (black image forming unit, yellow image forming unit, magenta image forming unit, and cyan image forming unit) in the tandem developing device 120 includes an electrostatic latent image bearing member 10 (black electrostatic latent image bearing member 10K, yellow electrostatic latent image bearing member 10Y, magenta electrostatic latent image bearing member 10M, and cyan electrostatic latent image bearing member 10C); a charging apparatus 160 uniformly charging the electrostatic latent image bearing member 10; an exposing apparatus exposing (L in FIG. 4) the electrostatic latent image bearing member based on each color image information according to an image corresponding to each color image to form an electrostatic latent image corresponding to each color image on the electrostatic latent image bearing member; a developing apparatus 61 developing the electrostatic latent image with each color toner (black toner, yellow toner, magenta toner, and cyan toner) to form a toner image of each color toner; a transfer charging device 62 transferring the toner image onto the intermediate transfer member 50, a cleaning apparatus 63; and a discharging device 64. Each image forming unit 18 can form an image of a single color (black image, yellow image, magenta image, and cyan image) based on the corresponding color image information. The thus-formed black image, yellow image, magenta image, and cyan image are sequentially transferred (primary transfer), that is, the black image formed on the black electrostatic latent image bearing member 10K, the yellow image formed on the yellow electrostatic latent image bearing member 10Y, the magenta image formed on the magenta electrostatic latent image bearing member 10M, and the cyan image formed on the cyan electrostatic latent image bearing member 10C are sequentially transferred onto the intermediate transfer member 50 rotatably moved by the support rollers 14, 15, and 16. The black image, the yellow image, the magenta image, and the cyan image are layered on the intermediate transfer member 50 to form a synthetic color image (color transfer image).

In the paper feeding table 200, one of paper feeding rollers 142 is selectively rotated to feed sheets (recording paper) from one of multiple paper feeding cassettes 144 provided in a paper bank 143. The sheets are separated one by one by a separating roller 145 to send each sheet to a paper feeding path 146. The sheet is conveyed by a conveying roller 147, guided to a paper feeding path 148 inside of the copier main body 150. The sheet abuts against a registration roller 49 to stop. Alternatively, the paper feeding roller 142 is rotated to feed sheets (recording paper) on a manual feeding tray 54. The sheets are separated one by one by the separating roller 145 to send each sheet to a manual paper feeding path 53. Similarly, the sheet abuts against the registration roller 49 to stop. The registration roller 49 is usually grounded and used. To remove paper powder of the sheet, the registration roller 49 may be used while bias is applied to the registration roller. The registration roller 49 is rotated in synchronization with the formation of the synthetic color image synthesized on the intermediate transfer member 50 (color transfer image) to send the sheet (recording paper) between the intermediate transfer member 50 and the secondary transfer apparatus 22. The synthetic color image (color transfer image) is transferred (secondary transfer) onto the sheet (recording paper) by the secondary transfer apparatus 22 to transfer the color image onto the sheet (recording paper) to form the color image. The remaining toner on the intermediate transfer member 50 after transfer of the image is cleaned by the intermediate transfer member cleaning apparatus 17.

The sheet (recording paper) having the transferred color image is conveyed by the secondary transfer apparatus 22 to the fixing apparatus 25. In the fixing apparatus 25, the synthetic color image (color transfer image) is fixed by heat and pressure on the sheet (recording paper). Subsequently, the sheet (recording paper) is discharged by a discharging roller 56 by operation of a switching nail 55 to be stacked on a catch tray 57. Alternatively, by operation of the switching nail 55, the sheet is flipped by the sheet flipping apparatus 28, and guided back to the transfer position. After an image is recorded on the rear surface of the sheet, the sheet is discharged by the discharging roller 56 to be stacked on the catch tray 57.

The image forming method used in the present invention and the image forming apparatus according to the present invention can form a high quality image efficiently because the toner according to the present invention having excellent low temperature fixing properties, high temperature off-set resistance, and heat-resistant preservation properties without producing filming is used.

EXAMPLES

Hereinafter, Examples of the present invention will be described, but the present invention will not be limited to these Examples. Methods for measuring values of physical properties of the resins used in Examples and Comparative Examples will be described below.

<Measurement of Number Average Molecular Weight Mn and Weight Average Molecular Weight Mw>

The number average molecular weight and weight average molecular weight of the resin were measured by gel permeation chromatography (GPC) as follows.

First, a column was stabilized inside of a heat chamber at 40° C. A solvent tetrahydrofuran (THF) was flowed in the column at 40° C. at a flow rate of 1 mL/min, and 50 μL to 200 μL of a resin sample solution in THF adjusted to a sample concentration of 0.05% by mass to 0.6% by mass was injected, and measured. In the measurement of the molecular weight of the sample, the molecular weight distribution in the sample was calculated from the relation between the logarithmic value in the calibration curve created using several monodisperse polystyrene standard samples and the count number. The calibration curve was created using at least 10 standard polystyrene samples made by Pressure Chemical Co. or Tosoh Corporation whose weight average molecular weights were $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$. A refractive index (RI) detector was used.

<Glass Transition Temperature Tg>

The glass transition temperature Tg of the resin was measured with a differential scanning calorimeter (DSC) (made by TA Instruments-Waters LLC, Q2000).

5 mg of the toner was sealed in a T-Zero easily sealed pan made by TA Instruments-Waters LLC, and set in the apparatus. In the measurement, under a nitrogen stream, the temperature was raised from −20° C. to 200° C. at a temperature raising rate of 10° C./min as the first raising, and kept for 5 minutes. The temperature was lowered to −20° C. at a temperature raising rate of 10° C./min, and kept for 5 minutes. Next, the temperature was raised to 200° C. at a temperature raising rate of 10° C./min as the second raising, and the change in heat was measured.

The glass transition temperature Tg was a value obtained using the graph representing the first raising of the temperature by a mid point method in the analysis program in the apparatus.

Synthesis Example 1 of Crystalline Resin

Synthesis of Crystalline Resin (Crystalline Polyester Resin) A-1

Sebacic acid and 1,4-butanediol were placed in a 5 L four-necked flask including a nitrogen introducing pipe, a dehydration tube, a stirrer, and a thermocouple at a molar ratio of a hydroxyl group to a carboxyl group (OH/COOH) of 1.2. These components with titanium tetraisopropoxide (500 mass ppm based on the resin component) were reacted at 190° C. for 12 hours. The temperature was raised to 200° C., and the reaction was performed for 3 hours, and at a pressure of 7.5 kPa for 2 hours. [Crystalline resin A-1] was prepared.

[Crystalline resin A-1] obtained had a weight average molecular weight Mw of 12,000, an Mw/Mn of 3.0, and a melting point of 62° C.

[Crystalline resin A-1] obtained was measured by an X ray diffraction method (crystal analysis X ray diffraction apparatus, X'Pert MRDX'Pert MRD, made by Royal Philips) for crystallinity. From the diffraction peak of the obtained diffraction spectrum, an endothermic peak was found in the range of $20°<2\theta<25°$ to determine that the resin had crystallinity.

Hereinafter, the measurement conditions for the X ray diffraction method are shown.

[Measurement Conditions]
Tension kV: 45 kV
Current: 40 mA
MPSS
Upper
Gonio
Scan mode: continuous
Start angle: 3°
End angle: 35°
Angle Step: 0.02°
Lucident Beam Optics
Divergence slit: Div slit ½
Difflection Beam Optics
Anti scatter slit: As Fixed ½
Receiving slit: Prog rec slit Synthesis Example 2 of Crystalline Resin Synthesis of Crystalline Resin (Crystalline Polyester Resin) A-2

Adipic acid, 1,6-hexanediol, and 1,4-butanediol were placed in a 5 L four-necked flask including a nitrogen introducing pipe, a dehydration tube, a stirrer, and a thermocouple such that a molar ratio of a hydroxyl group to a carboxyl group (OH/COOH) was 1.2, the acid component contained 100 mol % terephthalic acid, and the alcohol component contained 50 mol % 1,6-hexanediol and 50 mol % 1,4-butanediol. These components with titanium tetraisopropoxide (500 mass ppm based on the resin component) were reacted at 190° C. for 12 hours. The temperature was raised to 210° C., and the reaction was performed for 3 hours, and at a pressure of 8.0 kPa for 2 hours. [Crystalline resin A-2] was prepared.

[Crystalline resin A-2] obtained had a weight average molecular weight Mw of 13,000, an Mw/Mn of 2.9, and a melting point of 84° C.

[Crystalline resin A-2] obtained was measured by the X ray diffraction method as in Synthesis Example 1 of crystalline resin. From the diffraction peak of the diffraction spectrum, an endothermic peak was found in the range of $20°<2\theta<25°$ to determine that the resin had crystallinity.

Synthesis Example 3 of Crystalline Resin

Synthesis of Crystalline Resin (Crystalline Polyester Resin) A-3

Terephthalic acid, 1,6-hexanediol, and 1,4-butanediol were placed in a 5 L four-necked flask including a nitrogen introducing pipe, a dehydration tube, a stirrer, and a thermocouple such that a molar ratio of a hydroxyl group to a carboxyl group (OH/COOH) was 1.2, the acid component contained 100 mol % adipic acid, and the alcohol component contained 50 mol % 1,6-hexanediol and 50 mol % 1,4-butanediol. These components with titanium tetraisopropoxide (500 mass ppm based on the resin component) were reacted at 190° C. for 10 hours. The temperature was raised to 210° C., and the reaction was performed for 3 hours, and at a pressure of 8.3 kPa for 2 hours. [Crystalline resin A-3] was prepared.

[Crystalline resin A-3] obtained had a weight average molecular weight Mw of 13,000, an Mw/Mn of 3.2, a melting point of 49° C., and a glass transition temperature of 42° C.

[Crystalline resin A-3] obtained was measured by the X ray diffraction method as in Synthesis Example 1 of crystalline resin. From the diffraction peak of the diffraction spectrum, an endothermic peak was found in the range of $20°<2\theta<25°$ to determine that the resin had crystallinity.

Synthesis Example 4 of Crystalline Resin

Synthesis of Crystalline Resin (Crystalline Polyester Resin) A-4

Sebacic acid and 1,4-butanediol were placed in a 5 L four-necked flask including a nitrogen introducing pipe, a dehydration tube, a stirrer, and a thermocouple at a molar ratio of a hydroxyl group to a carboxyl group (OH/COOH) of 1.35. These components with titanium tetraisopropoxide (500 mass ppm based on the resin component) were reacted at 180° C. for 10 hours. The temperature was raised to 200° C., and the reaction was performed for 3 hours, and at a pressure of 7.5 kPa for 2 hours. [Crystalline resin A-4] was prepared.

[Crystalline resin A-4] obtained had a weight average molecular weight Mw of 5,000, an Mw/Mn of 2.5, and a melting point of 58° C.

[Crystalline resin A-4] obtained was measured by the X ray diffraction method (crystal analysis X ray diffraction apparatus, X'Pert MRDX'Pert MRD, made by Royal Philips) for crystallinity. From the diffraction peak of the obtained diffraction spectrum, an endothermic peak was found in the range of $20°<2\theta<25°$ to determine that the resin had crystallinity.

Synthesis Example 5 of Crystalline Resin

Synthesis of Crystalline Resin (Crystalline Polyester Resin) A-5

Sebacic acid and 1,4-butanediol were placed in a 5 L four-necked flask including a nitrogen introducing pipe, a dehydration tube, a stirrer, and a thermocouple at a molar ratio of a hydroxyl group to a carboxyl group (OH/COOH) of 1.08. These components with titanium tetraisopropoxide (500 mass ppm based on the resin component) were reacted at 190° C. for 12 hours. The temperature was raised to 210° C., and the reaction was performed for 3 hours, and at a pressure of 7.5 kPa for 4 hours. [Crystalline resin A-5] was prepared.

[Crystalline resin A-5] obtained had a weight average molecular weight Mw of 27,000, an Mw/Mn of 2.4, and a melting point of 64° C.

[Crystalline resin A-5] obtained was measured by the X ray diffraction method (crystal analysis X ray diffraction apparatus, X'Pert MRDX'Pert MRD, made by Royal Philips) for crystallinity. From the diffraction peak of the obtained diffraction spectrum, an endothermic peak was found in the range of $20°<2\theta<25°$ to determine that the resin had crystallinity.

TABLE 1-1

| | Acid component | Alcohol component | | Molar ratio (OH/COOH) |
|---|---|---|---|---|
| Crystalline resin A-1 | Sebacic acid | 1,4-Butanediol | — | 1.2 |
| Crystalline resin A-2 | Adipic acid | 1,4-Butanediol | 1,6-Hexanediol | 1.2 |
| Crystalline resin A-3 | Terephthalic acid | 1,4-Butanediol | 1,6-Hexanediol | 1.2 |
| Crystalline resin A-4 | Sebacic acid | 1,4-Butanediol | — | 1.35 |
| Crystalline resin A-5 | Sebacic acid | 1,4-Butanediol | — | 1.08 |

TABLE 1-2

| | Weight average molecular weight Mw | Mw/Mn | Melting point |
|---|---|---|---|
| Crystalline resin A-1 | 12,000 | 3.0 | 62° C. |
| Crystalline resin A-2 | 13,000 | 2.9 | 49° C. |
| Crystalline resin A-3 | 13,000 | 3.2 | 84° C. |
| Crystalline resin A-4 | 5,000 | 2.5 | 58° C. |
| Crystalline resin A-5 | 27,000 | 2.4 | 64° C. |

Synthesis Example 1 of Non-Crystalline Resin

Synthesis of Non-Crystalline Resin (Resin Having Polyhydroxycarboxylic Acid Skeleton) B-1

A total amount of 100 parts by mass of L-lactide and D-lactide at a molar ratio (L-lactide:D-lactide) of 90:10 was placed in a 5 L four-necked flask including a nitrogen introducing pipe, a dehydration tube, a stirrer, and a thermocouple. These components with 0.5 parts by mass of ethylene glycol and a catalyst, tin 2-ethylhexanoate (200 mass ppm based on the resin component) were reacted at 190° C. for 4 hours. The temperature was lowered to 175° C., and the reaction was performed at a pressure of 8.3 kPa for 2 hours. [Non-crystalline resin B-1] was prepared.

[Non-crystalline resin B-1] obtained had a weight average molecular weight Mw of 28,000, an Mw/Mn of 2.4, and a glass transition temperature of 54° C.

[Non-crystalline resin B-1] obtained was measured by the X ray diffraction method as in Synthesis Example 1 of crystalline resin. From the diffraction spectrum, a broad peak ranging wide in the measurement region was found to determine that the resin had non-crystallinity.

Synthesis Example 2 of Non-Crystalline Resin

Synthesis of Non-Crystalline Resin (Resin Having Polyhydroxycarboxylic Acid Skeleton) B-2

A total amount of 100 parts by mass of L-lactide and D-lactide at a molar ratio (L-lactide:D-lactide) of 90:10 was placed in a 5 L four-necked flask including a nitrogen introducing pipe, a dehydration tube, a stirrer, and a thermocouple. These components with 1.0 part by mass of ethylene glycol and a catalyst, tin 2-ethylhexanoate (200 mass ppm based on the resin component) were reacted at 190° C. for 3 hours. The temperature was lowered to 175° C., and the reaction was performed at a pressure of 8.3 kPa for 2 hours. [Non-crystalline resin B-2] was prepared.

[Non-crystalline resin B-2] obtained had a weight average molecular weight Mw of 12,000, an Mw/Mn of 2.2, and a glass transition temperature of 52° C.

[Non-crystalline resin B-2] obtained was measured by the X ray diffraction method as in Synthesis Example 1 of crystalline resin. From the diffraction spectrum, a broad peak ranging wide in the measurement region was found to determine that the resin had non-crystallinity.

Synthesis Example 3 of Non-Crystalline Resin

Synthesis of Non-Crystalline Resin (Resin Having Polyhydroxycarboxylic Acid Skeleton) B-3

A total amount of 100 parts by mass of L-lactide and D-lactide at a molar ratio (L-lactide:D-lactide) of 90:10 was placed in a 5 L four-necked flask including a nitrogen introducing pipe, a dehydration tube, a stirrer, and a thermocouple. These components with 0.2 parts by mass of ethylene glycol and a catalyst, tin 2-ethylhexanoate (200 mass ppm based on the resin component) were reacted at 190° C. for 6 hours. The temperature was lowered to 175° C., and the reaction was performed at a pressure of 8.3 kPa for 3 hours. [Non-crystalline resin B-3] was prepared.

[Non-crystalline resin B-3] obtained had a weight average molecular weight Mw of 45,000, an Mw/Mn of 2.6, and a glass transition temperature of 55° C.

[Non-crystalline resin B-3] obtained was measured by the X ray diffraction method as in Synthesis Example 1 of crystalline resin. From the diffraction spectrum, a broad peak ranging wide in the measurement region was found to determine that the resin had non-crystallinity.

TABLE 2-1

| | L/D molar ratio | | Amount of lactic acid | Initiator component | Amount of initiator |
|---|---|---|---|---|---|
| Non-crystalline resin B-1 | L-lactide (90) | D-lactide (10) | 100 Parts by mass | Ethylene glycol | 0.5 Parts by mass |
| Non-crystalline resin B-2 | L-lactide (90) | D-lactide (10) | 100 Parts by mass | Ethylene glycol | 1.0 Parts by mass |
| Non-crystalline resin B-3 | L-lactide (90) | D-lactide (10) | 100 Parts by mass | Ethylene glycol | 0.2 Parts by mass |

TABLE 2-2

| | Weight average molecular weight Mw | Mw/Mn | Glass transition temperature Tg (° C.) |
|---|---|---|---|
| Non-crystalline resin B-1 | 28,000 | 2.4 | 54 |
| Non-crystalline resin B-2 | 12,000 | 2.2 | 52 |
| Non-crystalline resin B-3 | 45,000 | 2.6 | 55 |

Synthesis Example 1 of Block Copolymerization Resin

Synthesis of Copolymerization Resin C-1

Crystalline resin A-1 and Non-crystalline resin B-1 at a mass ratio A/B of 30/70 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-1 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-1].

[Copolymerization resin C-1] obtained was measured for the weight average molecular weight Mw, the Mw/Mn, the glass transition temperature Tg, and the melting point mp. The results are shown in Table 3-2.

Synthesis Example 2 of Block Copolymerization Resin

Synthesis of Copolymerization Resin C-2

Crystalline resin A-2 and Non-crystalline resin B-1 at a mass ratio A/B of 30/70 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-2 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-2].

[Copolymerization resin C-2] obtained was measured for the weight average molecular weight Mw, the Mw/Mn, the glass transition temperature Tg, and the melting point mp. The results are shown in Table 3-2.

Synthesis Example 3 of Block Copolymerization Resin

Synthesis of Copolymerization Resin C-3

Crystalline resin A-3 and Non-crystalline resin B-1 at a mass ratio A/B of 30/70 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-3 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-3].

[Copolymerization resin C-3] obtained was measured for the weight average molecular weight Mw, the Mw/Mn, the glass transition temperature Tg, and the melting point mp. The results are shown in Table 3-2.

Synthesis Example 4 of Block Copolymerization Resin

Synthesis of Copolymerization Resin C-4

Crystalline resin A-4 and Non-crystalline resin B-1 at a mass ratio A/B of 50/50 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-4 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-4].

[Copolymerization resin C-4] obtained was measured for the weight average molecular weight Mw, the Mw/Mn, the glass transition temperature Tg, and the melting point mp. The results are shown in Table 3-2.

Synthesis Example 5 of Block Copolymerization Resin

Synthesis of Copolymerization Resin C-5

Crystalline resin A-5 and Non-crystalline resin B-1 at a mass ratio A/B of 25/75 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-5 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-5].

[Copolymerization resin C-5] obtained was measured for the weight average molecular weight Mw, the Mw/Mn, the glass transition temperature Tg, and the melting point mp. The results are shown in Table 3-2.

Synthesis Example 6 of Block Copolymerization Resin

Synthesis of Copolymerization Resin C-6

Crystalline resin A-1 and Non-crystalline resin B-1 at a mass ratio A/B of 18/82 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-1 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-6].

[Copolymerization resin C-6] obtained was measured for the weight average molecular weight Mw, the Mw/Mn, the glass transition temperature Tg, and the melting point mp. The results are shown in Table 3-2.

Synthesis Example 7 of Block Copolymerization Resin

Synthesis of Copolymerization Resin C-7

Crystalline resin A-1 and Non-crystalline resin B-1 at a mass ratio A/B of 48/52 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-1 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-7].

[Copolymerization resin C-7] obtained was measured for the weight average molecular weight Mw, the Mw/Mn, the glass transition temperature Tg, and the melting point mp. The results are shown in Table 3-2.

Synthesis Example 8 of Block Copolymerization Resin

Synthesis of Copolymerization Resin C-8

Crystalline resin A-4 and Non-crystalline resin B-2 at a mass ratio A/B of 30/70 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.60 as the ratio of an isocyanate group in the IPDI to the hydroxyl value OHa of Crystalline resin A-4 and the hydroxyl value OHb of Non-crystalline resin B-2. Under a nitrogen stream, these components were reacted at 80° C. for 5 hours. Ethyl acetate was distilled away under reduced pressure to prepare [Copolymerization resin C-8].

[Copolymerization resin C-8] obtained was measured for the weight average molecular weight Mw, the Mw/Mn, the glass transition temperature Tg, and the melting point mp. The results are shown in Table 3-2.

Synthesis Example 9 of Block Copolymerization Resin

Synthesis of Copolymerization Resin C-9

Crystalline resin A-5 and Non-crystalline resin B-3 at a mass ratio A/B of 30/70 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.75 as the ratio of an isocyanate group in the IPDI to the hydroxyl value OHa of Crystalline resin A-5 and the hydroxyl value OHb of Non-crystalline resin B-3. Under a nitrogen stream, these components were reacted at 80° C. for 8 hours. Ethyl acetate was distilled away under reduced pressure to prepare [Copolymerization resin C-9].

[Copolymerization resin C-9] obtained was measured for the weight average molecular weight Mw, the Mw/Mn, the glass transition temperature Tg, and the melting point mp. The results are shown in Table 3-2.

Synthesis Example 10 of Block Copolymerization Resin

Synthesis of Copolymerization Resin C-10

Crystalline resin A-1 and Non-crystalline resin B-1 at a mass ratio A/B of 12/88 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-1 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-10].

[Copolymerization resin C-10] obtained was measured for the weight average molecular weight Mw, the Mw/Mn, the glass transition temperature Tg, and the melting point mp. The results are shown in Table 3-2.

Synthesis Example 11 of Block Copolymerization Resin

Synthesis of Copolymerization Resin C-11

Crystalline resin A-1 and Non-crystalline resin B-1 at a mass ratio A/B of 70/30 were placed in a reaction tank including a cooling tube, a stirrer, and a nitrogen introducing pipe. A dilution of 50% by mass isophoronediisocyanate (IPDI) in ethyl acetate was prepared at NCO/(OHa+OHb)=0.65 as the ratio of an isocyanate group in the IPDI to the hydroxyl value OHa of Crystalline resin A-1 and the hydroxyl value OHb of Non-crystalline resin B-1. Under a nitrogen stream, these components were reacted at 80° C. for 5 hours. Ethyl acetate was distilled away under reduced pressure to prepare [Copolymerization resin C-11].

[Copolymerization resin C-11] obtained was measured for the weight average molecular weight Mw, the Mw/Mn, the glass transition temperature Tg, and the melting point mp. The results are shown in Table 3-2.

Synthesis Example 12 of Block Copolymerization Resin

Synthesis of Copolymerization Resin C'-1

300 parts by mass of Crystalline resin A-1, 700 parts by mass of Non-crystalline resin B-1, and 200 mass ppm of a catalyst, titanium tetraisopropoxide were placed in a 5 L four-necked flask including a nitrogen introducing pipe, a dehydration tube, a stirrer, and a thermocouple, and reacted at 180° C. for 4 hours. The temperature was lowered to 170° C., and the reaction was performed at a pressure of 8.3 kPa for 1 hour to prepare [Copolymerization resin C'-1]. The resin had a crystalline portion and a non-crystalline portion in the molecule attributed to a transesterification reaction, not via a urethane group.

[Copolymerization resin C'-1] obtained was measured for the weight average molecular weight Mw, the Mw/Mn, the glass transition temperature Tg, and the melting point mp. The results are shown in Table 3-2.

TABLE 3-1

|  | Crystalline resin A | Non-crystalline resin B | Mass ratio A/B | Isocyanate compound | NCO/ (OHa + OHb) |
|---|---|---|---|---|---|
| Copolymerization resin C-1 | Resin A-1 | Resin B-1 | 30/70 | IPDI | 0.65 |
| Copolymerization resin C-2 | Resin A-2 | Resin B-1 | 30/70 | IPDI | 0.65 |
| Copolymerization resin C-3 | Resin A-3 | Resin B-1 | 30/70 | IPDI | 0.65 |
| Copolymerization resin C-4 | Resin A-4 | Resin B-1 | 50/50 | IPDI | 0.65 |
| Copolymerization resin C-5 | Resin A-5 | Resin B-1 | 25/75 | IPDI | 0.65 |
| Copolymerization resin C-6 | Resin A-1 | Resin B-1 | 18/82 | IPDI | 0.65 |
| Copolymerization resin C-7 | Resin A-1 | Resin B-1 | 48/52 | IPDI | 0.65 |
| Copolymerization resin C-8 | Resin A-4 | Resin B-2 | 30/70 | IPDI | 0.60 |
| Copolymerization resin C-9 | Resin A-5 | Resin B-3 | 30/70 | IPDI | 0.75 |
| Copolymerization resin C-10 | Resin A-1 | Resin B-1 | 12/88 | IPDI | 0.65 |
| Copolymerization resin C-11 | Resin A-1 | Resin B-1 | 70/30 | IPDI | 0.65 |
| Copolymerization resin C'-1 | Resin A-1 | Resin B-1 | 30/70 | None | — |

TABLE 3-2

|  | Weight average molecular weight Mw | Mw/Mn | Tg (° C.) | mp (° C.) |
|---|---|---|---|---|
| Copolymerization resin C-1 | 35,000 | 2.2 | 34 | 60 |
| Copolymerization resin C-2 | 32,000 | 2.4 | 33 | 48 |
| Copolymerization resin C-3 | 36,000 | 2.5 | 35 | 82 |
| Copolymerization resin C-4 | 28,000 | 3.5 | 19 | 57 |
| Copolymerization resin C-5 | 37,000 | 2.1 | 51 | 63 |
| Copolymerization resin C-6 | 34,000 | 2.4 | 36 | 60 |
| Copolymerization resin C-7 | 26,000 | 2.4 | 38 | 60 |
| Copolymerization resin C-8 | 19,000 | 2.2 | 32 | 60 |
| Copolymerization resin C-9 | 100,100 | 2.8 | 36 | 60 |
| Copolymerization resin C-10 | 32,000 | 2.5 | 33 | 59 |
| Copolymerization resin C-11 | 24,000 | 2.3 | 39 | 60 |
| Copolymerization resin C'-1 | 25,000 | 2.0 | 36 | 61 |

Example 1

Production of Toner

—Preparation of Masterbatch (MB)—

1,200 parts by mass of water, 500 parts by mass of carbon black (Printex 35, made by Degussa AG, DBP absorption number=42 mL/100 mg, pH=9.5), and 500 parts by mass of [Non-crystalline resin B-1] were added, and mixed with a Henschel mixer (made by NIPPON COKE & ENGINEERING CO., LTD.) to prepare a mixture. The mixture was kneaded with a two-roll mill at 150° C. for 30 minutes. The kneaded product was rolled and cooled, and ground with a pulverizer to prepare [Masterbatch 1].

—Production of Wax Dispersion Liquid—

In a container including a stirring rod and a thermometer, 50 parts by mass of paraffin wax (made by Nippon Seiro Co., Ltd., HNP-109, hydrocarbon wax, melting point: 75° C., SP value: 8.8) as a [mold release agent] and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Wax dispersion liquid 1].

—Preparation of Crystalline Resin Dispersion Liquid D-1—

In a container including a stirring rod and a thermometer, 50 parts by mass of [Crystalline resin A-1] and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Crystalline resin dispersion liquid D-1] (solid content concentration: 10% by mass).

—Preparation of Oil Phase—

500 parts by mass of [Wax dispersion liquid 1], 1,000 parts by mass of [Crystalline resin dispersion liquid D-1], 750 parts by mass of [Copolymerization resin C-1], and 100 parts by mass of [Masterbatch 1] were placed in a container, and mixed at 10,000 rpm for 60 minutes with a T.K. Homo Mixer (made by Tokushu Kika Kogyo Co., Ltd.) to prepare [Oil phase 1].

—Preparation of Aqueous Phase—

990 parts by mass of water, 10 parts by mass of an aqueous solution of 50% by mass sodium dodecylsulfate (made by Tokyo Chemical Industry Co., Ltd.), 5 parts by mass of sodium chloride (made by Tokyo Chemical Industry Co., Ltd.), and 100 parts by mass of ethyl acetate were mixed by stirring to prepare an opaque white liquid. This liquid was used as [Aqueous phase 1].

—Emulsification and Removal of Solvent—

1,200 parts by mass of [Aqueous phase 1] was added to the container including [Oil phase 1], and mixed with a T.K. Homo Mixer (made by Tokushu Kika Kogyo Co., Ltd.) at the number of rotation of 13,000 rpm for 20 minutes to prepare [Emulsified slurry 1].

[Emulsified slurry 1] was placed in a container including a stirrer and a thermometer, and the solvent was removed at 30° C. over 8 hours. The slurry was then aged at 45° C. for 4 hours to prepare [Disperse slurry 1].

—Washing and Drying—

100 parts by mass of [Disperse slurry 1] was filtered under reduced pressure, and washed and dried as follows.

(1) 100 parts by mass of ion exchange water was added to the filtered cake, and mixed with a T.K. Homo Mixer (number of rotation: 12,000 rpm, 10 minutes). The mixture was filtered.

(2) 100 parts by mass of an aqueous solution of 10% by mass sodium hydroxide was added to the filtered cake in (1), and mixed with a T.K. Homo Mixer (number of rotation: 12,000 rpm, 30 minutes). The mixture was filtered under reduced pressure.

(3) 100 parts by mass of 10% by mass hydrochloric acid was added to the filtered cake in (2), and mixed with a T.K. Homo Mixer (number of rotation: 12,000 rpm, 10 minutes). The mixture was filtered.

(4) 300 parts by mass of ion exchange water was added to the filtered cake in (3), and mixed with a T.K. Homo Mixer (number of rotation: 12,000 rpm, 10 minutes). The mixture was filtered. The operation of (1) to (4) was performed twice to prepare [Filtered cake 1].

[Filtered cake 1] obtained was dried with a circulating air dryer at 45° C. for 48 hours. The dried cake was sieved with a mesh having an opening of 75 μm to prepare [Toner 1] in Example 1.

Example 2

Production of Toner

[Toner 2] in Example 2 was prepared as in Example 1 except that [Crystalline resin dispersion liquid D-1] in Example 1 was replaced by [Crystalline resin dispersion liquid D-2] described below and Copolymerization resin C-1 was replaced by Copolymerization resin C-2.

—Preparation of Crystalline Resin Dispersion Liquid D-2—

In a container including a stirring rod and a thermometer, 50 parts by mass of [Crystalline resin A-2] and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Crystalline resin dispersion liquid D-2] (solid content concentration: 10% by mass).

Example 3

Production of Toner

[Toner 3] in Example 3 was prepared as in Example 1 except that [Crystalline resin dispersion liquid D-1] in Example 1 was replaced by [Crystalline resin dispersion liquid D-3] described below and [Copolymerization resin C-1] was replaced by [Copolymerization resin C-3].

—Preparation of Crystalline Resin Dispersion Liquid D-3—

In a container including a stirring rod and a thermometer, 50 parts by mass of [Crystalline resin A-3], and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Crystalline resin dispersion liquid D-3] (solid content concentration: 10% by mass).

Example 4

Production of Toner

[Toner 4] in Example 4 was prepared as in Example 1 except that [Crystalline resin dispersion liquid D-1] in Example 1 was replaced by [Crystalline resin dispersion liquid D-4] described below and [Copolymerization resin C-1] was replaced by [Copolymerization resin C-4].

—Preparation of Crystalline Resin Dispersion Liquid D-4—

In a container including a stirring rod and a thermometer, 50 parts by mass of [Crystalline resin A-4], and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Crystalline resin dispersion liquid D-4] (solid content concentration: 10% by mass).

Example 5

Production of Toner

[Toner 5] in Example 5 was prepared as in Example 1 except that [Crystalline resin dispersion liquid D-1] in Example 1 was replaced by [Crystalline resin dispersion liquid D-5] described below and [Copolymerization resin C-1] was replaced by [Copolymerization resin C-5].
—Preparation of Crystalline Resin Dispersion Liquid D-5—
In a container including a stirring rod and a thermometer, 50 parts by mass of [Crystalline resin A-5], and 450 parts by mass of ethyl acetate were placed. Under stirring, the temperature was raised to 80° C., kept at 80° C. for 5 hours, and lowered to 30° C. over 1 hour. Zirconia beads having a diameter of 0.5 mm were placed in a bead mill (Ultra Visco Mill, made by Aimex Co., Ltd.) up to 80% by volume of the bead mill. These materials were dispersed with the bead mill at a solution feeding rate of 1 kg/h and a disk circumferential speed of 6 m/sec under a 3-pass condition to prepare [Crystalline resin dispersion liquid D-5] (solid content concentration: 10% by mass).

Example 6

Production of Toner

[Toner 6] in Example 6 was prepared as in Example 1 except that 1,000 parts by mass of [Crystalline resin dispersion liquid D-1] in the "Preparation of oil phase" in Example 1 was changed to 0 parts by mass and 750 parts by mass of [Copolymerization resin C-1] was changed to 850 parts by mass.

Example 7

Production of Toner

[Toner 7] in Example 7 was prepared as in Example 1 except that [Copolymerization resin C-1] in Example 1 was replaced by [Copolymerization resin C-6].

Example 8

Production of Toner

[Toner 8] in Example 8 was prepared as in Example 1 except that [Copolymerization resin C-1] in Example 1 was replaced by [Copolymerization resin C-7].

Example 9

Production of Toner

[Toner 9] in Example 9 was prepared as in Example 1 except that [Copolymerization resin C-1] in Example 1 was replaced by [Copolymerization resin C-8].

Example 10

Production of Toner

[Toner 10] in Example 10 was prepared as in Example 1 except that [Copolymerization resin C-1] in Example 1 was replaced by [Copolymerization resin C-9].

Example 11

Production of Toner

[Toner 11] in Example 11 was prepared as in Example 1 except that 1,000 parts by mass of [Crystalline resin dispersion liquid D-1] in "Preparation of oil phase" in Example 1 was changed to 0 parts by mass and 750 parts by mass of [Copolymerization resin C-1] was changed to 850 parts by mass of [Copolymerization resin C-10].

Comparative Example 1

Production of Toner

[Toner 12] in Comparative Example 1 was prepared as in Example 1 except that the amounts of the respective materials blended in "Preparation of oil phase" in Example 1 were changed as follows.
—Preparation of Oil Phase—
500 parts by mass of [Wax dispersion liquid 1], 3,000 parts by mass of [Crystalline resin dispersion liquid D-1], 550 parts by mass of [Non-crystalline resin B-1], and 100 parts by mass of [Masterbatch 1] were placed in a container, and mixed with a T.K. Homo Mixer (made by Tokushu Kika Kogyo Co., Ltd.) at 10,000 rpm for 60 minutes to prepare [Oil phase 12].

Comparative Example 2

Production of Toner

[Toner 13] in Comparative Example 2 was prepared as in Example 1 except that [Copolymerization resin C-1] in Example 1 was replaced by [Copolymerization resin C'-1].

Comparative Example 3

Production of Toner

[Toner 14] in Comparative Example 3 was prepared as in Example 1 except that the amounts of the respective materials blended in "Preparation of oil phase" in Example 1 were changed as follows.
—Preparation of Oil Phase—
500 parts by mass of [Wax dispersion liquid 1], 850 parts by mass of [Non-crystalline resin B-1], and 100 parts by mass of [Masterbatch 1] were placed in a container, and mixed with a T.K. Homo Mixer (made by Tokushu Kika Kogyo Co., Ltd.) at 10,000 rpm for 60 minutes to prepare [Oil phase 14].

Comparative Example 4

Production of Toner

[Toner 15] in Comparative Example 4 was prepared as in Example 1 except that [Copolymerization resin C-1] in Example 1 was replaced by [Copolymerization resin C-11].

<Measurement of Glass Transition Temperature Tg of Toner, Endothermic Peak Temperature Mp of Toner, and Amounts of Heat Absorbed (Q1 and Q2)>

The Tg, mp, Q1, and Q2 were measured as follows. To provide a constant crystalline or non-crystalline state of the toner at the initial period, the toner measured was kept at a constant temperature environment at 45° C. and a humidity of 20% RH or less for 24 hours, then preserved at a temperature of 23° C. or less, and measured within 24 hours. This procedure reduced influences of the heat history on the crystalline or non-crystalline state of the toner due to the preservation environment to attain a constant state.

5 mg of toner particles was sealed in a T-Zero easily sealed pan made by TA Instruments-Waters LLC, and measured with a differential scanning calorimeter (DSC) (made by TA Instruments-Waters LLC, Q2000). In the measurement, under a nitrogen stream, the temperature was raised from −20° C. to 200° C. at a temperature raising rate of 10° C./min as the first raising, and kept for 5 minutes. The temperature was lowered to −20° C. at a temperature raising rate of 10° C./rain, and kept for 5 minutes. Next, the temperature was raised to 200° C. at a temperature raising rate of 10° C./min as the second raising, and the change in heat was measured. The "amounts of heat absorbed and heat generated" and the "temperature" were plotted. The temperature at a characteristic inflection point observed at this time was defined as the glass transition temperature (Tg).

The glass transition temperature (Tg) was a value obtained using the graph representing the first raising of the temperature by a mid point method in the analysis program in the apparatus.

For the endothermic peak temperature (rap), the temperature at the highest peak can be calculated using the graph representing the first raising of the temperature by the analysis program in the apparatus.

For the Q1, the amount of the heat of melting of the crystalline component was calculated using the graph representing the first raising of the temperature by the analysis program in the apparatus.

For the Q2, the amount of the heat of melting of the crystalline component was calculated using the graph representing the second raising of the temperature by the analysis program in the apparatus.

<Amount of TMA Compression Deformation>

The amount of TMA compression deformation was measured using a tablet prepared from 0.5 g of the toner with a tableting machine having a diameter of 3 mm (made by SHIMADZU Corporation) with a thermomechanical analyzer (made by SII Nano Technology Inc., EXSTAR7000). In the measurement, under a nitrogen stream, the temperature was raised from 0° C. to 180° C. at 2° C./rain. The amount of TMA compression deformation was measured in a compression mode. The compression force at this time was 100 mN. From the graph of the obtained sample temperature and compression displacement (deformation rate), the amount of compression deformation at 50° C. was read, and the value was defined as the amount of TMA compression deformation.

<Measurement of Crystallization Degree of Toner by X Ray Diffraction Method>

The toner was measured by the X ray diffraction method with a crystal analysis X ray diffraction apparatus (X'Pert MRDX'Pert MRD, made by Royal Philips).

First, the target sample toner was pounded with a mortar to produce a sample powder. The obtained sample powder was uniformly applied to a sample holder. Subsequently, the sample holder was disposed inside of the crystal analysis X ray diffraction apparatus, and the measurement was performed to obtain a diffraction spectrum.

From the obtained diffraction peaks, the peaks in the range of 20°<2θ<25° were defined as an endothermic peak derived from the crystalline resin. The broad peak ranging wide in the measured region was defined as a component derived from the non-crystalline resin. In the endothermic peak and the broad peak, a background was removed from the diffraction spectrum and an integrated area was calculated. The area value derived from the crystalline resin was defined as Sc, and the area value derived from the non-crystalline resin was defined as Sa. From Sc/Sa, the relative degree of crystallization was calculated.

The measurement conditions for the X ray diffraction method will be shown below.

[Measurement Conditions]
Tension kV: 45 kV
Current: 40 mA
MPSS
Upper
Gonio
Scan mode: continuous
Start angle: 3°
End angle: 35°
Angle Step: 0.02°
Lucident Beam Optics
Divergence slit: Div slit ½
Difflection Beam Optics
Anti scatter slit: As Fixed ½
Receiving slit: Prog rec slit (Production of Developer)
—Production of Carrier—

100 parts by mass of a silicone resin (organo straight silicone, made by Shin-Etsu Chemical Co., Ltd.), 5 parts by mass of γ-(2-aminoethyl)aminopropyltrimethoxysilane, and 10 parts by mass of carbon black were added to 100 parts by mass of toluene, and dispersed with a homomixer for 20 minutes to prepare a resin layer coating solution.

Next, the resin layer coating solution was applied to the surface of a spherical magnetite (1,000 parts by mass) having a volume average particle size of 50 μm with a fluidized bed coating apparatus to produce [Carrier].

—Production of Developer—

5 parts by mass of each of [Toners] was mixed with 95 parts by mass of [Carrier] using a ball mill to produce [Developer].

Next, properties of [Toners] and [Developers] thus produced were evaluated as follows. The results are shown in Table 4.

<Low Temperature Fixing Properties and High Temperature Off-Set Resistance>

A copy test was performed on a Type 6200 paper (made by Ricoh Company, Ltd.) using an image forming apparatus, which was a copier (MF2200, made by Ricoh Company, Ltd.) including a fixing part having a Teflon (registered trademark) roller as the fixing roller and modified to vary the temperature of the fixing roller.

The temperature of the fixing roller was varied to determine the low temperature off-set temperature (lower limit fixing temperature) and the high temperature off-set temperature (upper limit fixing temperature) under the following evaluation conditions, and low temperature fixing properties and high temperature off-set resistance were evaluated according to the following criteria. Specifically, low temperature off-set and high temperature off-set were visually evaluated by determining whether the image had off-set at a place on the paper spaced by the circumferential length of the fixing roller from the fixed image portion. An image having off-set was determined as bad. The lowest temperature at which low temperature off-set did not occur was defined as a lower limit fixing temperature, and the highest temperature at which high temperature off-set did not occur was defined as an upper limit fixing temperature.

The evaluation conditions for the lower limit fixing temperature were as follows: the paper feeding linear velocity was 120 mm/sec to 150 mm/sec, the planar pressure was 1.2 kgf/cm$^2$, and the nip width was 3 mm.

The evaluation conditions for the upper limit fixing temperature were: the paper feeding linear velocity was 50 mm/sec, the planar pressure was 2.0 kgf/cm$^2$, and the nip width was 4.5 mm.

[Evaluation Criteria for Low Temperature Fixing Properties]
A: lower limit fixing temperature is 105° C. or less
B: lower limit fixing temperature is more than 105° C. and 115° C. or less
C: lower limit fixing temperature is more than 115° C. and 125° C. or less
D: lower limit fixing temperature is more than 125° C.

[Evaluation Criteria for High Temperature Off-Set Resistance]
A: upper limit fixing temperature is 200° C. or more
B: upper limit fixing temperature is 180° C. or more and less than 200° C.
C: upper limit fixing temperature is 160° C. or more and less than 180° C.
D: upper limit fixing temperature is less than 160° C.

<Heat-Resistant Preservation Properties>

Each of the toners was placed in a 50 mL glass container, and the container was placed in a 50° C. thermostat and stood for 20 hours. Subsequently, the toner was cooled to room temperature (25° C.). A penetration (mm) was measured in accordance with a penetration test (JIS K2235-1991), and heat-resistant preservation properties were evaluated according to the following criteria. A greater value of the penetration indicates better heat-resistant preservation properties of the toner.

[Evaluation Criteria]
A: penetration is 20 mm or more
B: penetration is 15 mm or more and less than 20 mm
C: penetration is 10 mm or more and less than 15 mm
D: penetration is less than 10 mm <Filming>

A test chart including a solid image, a halftone image, a bold line, and a thin line was output with an image forming apparatus (MF2800, made by Ricoh Company, Ltd.), and the surface of the photoconductor was visually observed after 10,000 sheets were output and after 100,000 sheets were output and evaluated for the solidification of the toner (mainly the mold release agent) to the photoconductor according to the following criteria. After 10,000 sheets were output and after 100,000 sheets were output, they were evaluated for image abnormalities such as unevenness and unsmoothness of the solid portion and the halftone portion of the image and image abnormalities of the bold line and the thin line such as lacking, according to the following criteria.

[Evaluation Criteria]
A: the solidification of the toner to the photoconductor is not found after 100,000 sheets are output.
B: the solidification of the toner to the photoconductor is not found after 10,000 sheets are output. The solidification of the toner to the photoconductor is found after 100,000 sheets are output, but the image has no abnormality.
C: the solidification of the toner to the photoconductor is found after 10,000 sheets are output, but the image has no abnormality. The solidification of the toner to the photoconductor is also found after 100,000 sheets are output, and the image has abnormality.
D: the solidification of the toner to the photoconductor is found after 10,000 sheets are output, and the image has abnormality.

TABLE 4

| | | Example 1 | Example 2 | Example 3 | Example 4 |
|---|---|---|---|---|---|
| Copolymerization resin C | Copolymerization resin C No. | 1 | 2 | 3 | 4 |
| | Resin A No. | 1 | 2 | 3 | 4 |
| | Resin B No. | 1 | 1 | 1 | 1 |
| | Mass ratio (A/B) | 30/70 | 30/70 | 30/70 | 50/50 |
| Content of Copolymerization resin C (% by mass) | | 75 | 75 | 75 | 75 |
| Weight average molecular weight of Copolymerization resin C | | 35,000 | 32,000 | 36,000 | 28,000 |
| Crystalline polyester resin D No. | | 1 | 2 | 3 | 4 |
| Content of Resin D (% by mass) | | 10.0 | 10.0 | 10.0 | 10.0 |
| Glass transition temperature Tg of toner (° C.) | | 35 | 32 | 36 | 18 |
| Endothermic peak temperature mp of toner (° C.) | | 60 | 48 | 82 | 57 |
| Amount of heat absorbed Q1 (J/g) | | 30 | 25 | 28 | 20 |
| Amount of heat absorbed Q2 (J/g) | | 5 | 5 | 6 | 4 |
| Ratio Q2/Q1 | | 0.17 | 0.2 | 0.21 | 0.2 |
| Amount of TMA compression deformation of toner (%) | | 3 | 6 | 2 | 6 |
| Relative degree of crystallization of toner (%) | | 30 | 24 | 22 | 28 |
| Low temperature fixing properties | Lower limit fixing temperature (° C.) | 100 | 100 | 110 | 100 |
| | Evaluation | A | A | A | A |
| High temperature off-set resistance | Upper limit fixing temperature (° C.) | 210 | 190 | 210 | 190 |
| | Evaluation | A | B | A | B |
| Heat-resistant preservation properties | | A | B | A | B |
| Filming | | A | B | A | B |

| | | Example 5 | Example 6 | Example 7 | Example 8 |
|---|---|---|---|---|---|
| Copolymerization resin C | Copolymerization resin C No. | 5 | 1 | 6 | 7 |
| | Resin A No. | 5 | 1 | 1 | 1 |
| | Resin B No. | 1 | 1 | 1 | 1 |
| | Mass ratio (A/B) | 25/75 | 30/70 | 18/82 | 48/52 |
| Content of Copolymerization resin C (% by mass) | | 75 | 85 | 75 | 75 |
| Weight average molecular weight of Copolymerization resin C | | 37,000 | 35,000 | 34,000 | 26,000 |
| Crystalline polyester resin D No. | | 5 | 0 | 1 | 1 |

TABLE 4-continued

|  |  | | | |
|---|---|---|---|---|
| Content of Resin D (% by mass) | 10.0 | 0 | 10.0 | 10.0 |
| Glass transition temperature Tg of toner (° C.) | 52 | 37 | 42 | 33 |
| Endothermic peak temperature mp of toner (° C.) | 63 | 60 | 60 | 61 |
| Amount of heat absorbed Q1 (J/g) | 32 | 20 | 19 | 55 |
| Amount of heat absorbed Q2 (J/g) | 8 | 4 | 4 | 35 |
| Ratio Q2/Q1 | 0.25 | 0.2 | 0.21 | 0.64 |
| Amount of TMA compression deformation of toner (%) | 2 | 3 | 3 | 4 |
| Relative degree of crystallization of toner (%) | 26 | 20 | 16 | 48 |
| Low temperature fixing properties | Lower limit fixing temperature (° C.) | 110 | 110 | 110 | 105 |
| | Evaluation | B | B | B | B |
| High temperature off-set resistance | Upper limit fixing temperature (° C.) | 210 | 210 | 210 | 185 |
| | Evaluation | A | A | A | B |
| Heat-resistant preservation properties | A | A | A | A |
| Filming | A | A | A | B |

|  |  | Example 9 | Example 10 | Example 11 |
|---|---|---|---|---|
| Copolymerization resin C | Copolymerization resin C No. | 8 | 9 | 10 |
| | Resin A No. | 4 | 5 | 1 |
| | Resin B No. | 2 | 3 | 1 |
| | Mass ratio (A/B) | 30/70 | 30/70 | 12/88 |
| Content of Copolymerization resin C (% by mass) | 75 | 75 | 75 |
| Weight average molecular weight of Copolymerization resin C | 19,000 | 100,100 | 32,000 |
| Crystalline polyester resin D No. | 1 | 1 | 1 |
| Content of Resin D (% by mass) | 10.0 | 10.0 | 0 |
| Glass transition temperature Tg of toner (° C.) | 36 | 33 | 36 |
| Endothermic peak temperature mp of toner (° C.) | 60 | 60 | 59 |
| Amount of heat absorbed Q1 (J/g) | 25 | 35 | 9 |
| Amount of heat absorbed Q2 (J/g) | 3 | 10 | 0 |
| Ratio Q2/Q1 | 0.12 | 0.29 | 0.00 |
| Amount of TMA compression deformation of toner (%) | 5 | 2 | 4 |
| Relative degree of crystallization of toner (%) | 25 | 33 | 11 |
| Low temperature fixing properties | Lower limit fixing temperature (° C.) | 105 | 115 | 115 |
| | Evaluation | B | B | B |
| High temperature off-set resistance | Upper limit fixing temperature (° C.) | 175 | 210 | 210 |
| | Evaluation | B | A | B |
| Heat-resistant preservation properties | B | A | B |
| Filming | B | A | A |

|  |  | Comparative Example 1 | Comparative Example 2 | Comparative Example 3 | Comparative Example 4 |
|---|---|---|---|---|---|
| Copolymerization resin C | Copolymerization resin C No. | — | — | — | 11 |
| | Resin A No. | — | — | — | 1 |
| | Resin B No. | — | — | — | 1 |
| | Mass ratio (A/B) | — | — | — | 70/30 |
| Content of Copolymerization resin C (% by mass) | 0 | 0 | 0 | 75 |
| Weight average molecular weight of Copolymerization resin C | — | — | — | 24,000 |
| Content of Non-crystalline B-1 (% by mass) | 60 | — | 90 | 5 |
| Content of Copolymerization resin C'-1 (5 by mass) | — | 75 | — | — |
| Crystalline polyester resin D No. | 1 | 1 | — | 1 |
| Content of Resin D (% by mass) | 30.0 | 10.0 | 0 | 10.0 |
| Glass transition temperature Tg of toner (° C.) | 54 | 38 | 55 | 33 |
| Endothermic peak temperature mp of toner (° C.) | 60 | 29 | — | 61 |
| Amount of heat absorbed Q1 (J/g) | 18 | 27 | — | 55 |
| Amount of heat absorbed Q2 (J/g) | 12 | 7 | — | 35 |
| Ratio Q2/Q1 | 0.67 | 0.26 | — | 0.64 |
| Amount of TMA compression deformation of toner (%) | 8 | 8 | 3 | 6 |
| Relative degree of crystallization of toner (%) | 35 | 32 | 5 | 52 |
| Low temperature fixing properties | Lower limit fixing temperature (° C.) | 125 | 110 | 140 | 120 |
| | Evaluation | C | B | D | C |
| High temperature off-set resistance | Upper limit fixing temperature (° C.) | 160 | 165 | 200 | 150 |
| | Evaluation | C | C | A | D |
| Heat-resistant preservation properties | C | C | A | C |
| Filming | D | C | A | C |

The results in Table 4 revealed that the toners in Examples 1 to 11 are superior to those in Comparative Example 1 to 4 with respect to all the evaluation items, i.e. low temperature fixing properties, high temperature off-set resistance, heat-resistant preservation properties, and filming.

Aspects of the present invention are as follows.

<1> A toner, including:
a copolymerization resin,
wherein the copolymerization resin includes: a unit derived from a polyester resin including a polycarboxylic acid having a valence of 2 or more and a polyol having a valence of 2 or more; and a unit derived from a resin having a polyhydroxycarboxylic acid skeleton, where the unit derived from the resin having a polyhydroxycarboxylic acid skeleton is bonded to the unit derived from the polyester resin via at least one of a urethane group and a urea group, and
wherein the toner has a relative degree of crystallization of 10% or more and less than 50%.

<2> The toner according to <1>, wherein an endothermic peak temperature of the toner measured by differential scanning calorimetry is 50° C. or more and less than 80° C.

<3> The toner according to <1> or <2>, wherein a glass transition temperature of the toner measured by differential scanning calorimetry is 20° C. or more and less than 50° C.

<4> The toner according to any one of <1> to <3>, wherein an amount of compression deformation at 50° C. of the toner measured by a thermomechanical analysis method is 5% or less.

<5> The toner according to any one of <1> to <4>, further including a crystalline resin other than the copolymerization resin.

<6> The toner according to any one of <1> to <5>, wherein a mass ratio A/B of the unit derived from the polyester resin indicated by A to the unit derived from the resin having a polyhydroxycarboxylic acid skeleton indicated by B in the copolymerization resin is 20/80 to 50/50.

<7> The toner according to any one of <1> to <6>, wherein the copolymerization resin has a weight average molecular weight of 20,000 to 100,000.

<8> The toner according to any one of <1> to <7>, wherein a ratio Q2/Q1 satisfies expression (1) below and Q1 satisfies expression (2) below where Q1 is an amount of heat absorbed in a first raising of a temperature of the toner in DSC and Q2 is an amount of heat absorbed in a second raising of a temperature of the toner in DSC:

$$0 \le Q2/Q1 < 0.30 \quad (1),$$

and $$Q1 > 10 J/g \quad (2).$$

<9> A developer, including:
the toner according to any one of <1> to <8>.

<10> An image forming apparatus, including:
an electrostatic latent image bearing member;
an electrostatic latent image forming unit configured to form an electrostatic latent image on the electrostatic latent image bearing member;
a developing unit configured to develop the electrostatic latent image with a toner to form a visible image;
a transferring unit configured to transfer the visible image onto a recording medium; and
a fixing unit configured to fix the visible image transferred onto the recording medium,
wherein the toner is the toner according to any one of <1> to <8>.

REFERENCE SIGNS LIST 10 photoconductor (photoconductor drum)
10K black electrostatic latent image bearing member
10Y yellow electrostatic latent image bearing member
10M magenta electrostatic latent image bearing member
10C cyan electrostatic latent image bearing member
18 image forming unit
20 charging roller
21 exposing apparatus
22 secondary transfer apparatus
25 fixing apparatus
30 exposing apparatus
40 developing apparatus
45K black developing unit
45Y yellow developing unit
45M magenta developing unit
45C cyan developing unit
50 intermediate transfer member
58 corona charging device
60 cleaning apparatus
61 developing device
62 transfer charging device
80 transfer roller
95 recording medium
100 image forming apparatus
120 tandem developing device

The invention claimed is:
1. A toner, comprising:
a copolymerization resin,
wherein the copolymerization resin comprises: a unit derived from a polyester resin including a polycarboxylic acid having a valence of 2 or more and a polyol having a valence of 2 or more; and a unit derived from a resin having a polyhydroxycarboxylic acid skeleton, where the unit derived from the resin having a polyhydroxycarboxylic acid skeleton is bonded to the unit derived from the polyester resin via at least one of a urethane group and a urea group, and
wherein the toner has a relative degree of crystallization of 10% or more and less than 50%.

2. The toner according to claim 1, wherein an endothermic peak temperature of the toner measured by differential scanning calorimetry is 50° C. or more and less than 80° C.

3. The toner according to claim 1, wherein a glass transition temperature of the toner measured by differential scanning calorimetry is 20° C. or more and less than 50° C.

4. The toner according to claim 1, wherein an amount of compression deformation at 50° C. of the toner measured by a thermomechanical analysis method is 5% or less.

5. The toner according to claim 1, further comprising a crystalline resin other than the copolymerization resin.

6. The toner according to claim 1, wherein a mass ratio A/B of the unit derived from the polyester resin indicated by A to the unit derived from the resin having a polyhydroxycarboxylic acid skeleton indicated by B in the copolymerization resin is 20/80 to 50/50.

7. The toner according to claim 1, wherein the copolymerization resin has a weight average molecular weight of 20,000 to 100,000.

8. The toner according to claim 1, wherein a ratio Q2/Q1 satisfies expression (1) below and Q1 satisfies expression (2) below where Q1 is an amount of heat absorbed in a first raising of a temperature of the toner in DSC and Q2 is an amount of heat absorbed in a second raising of a temperature of the toner in DSC:

$$0 \le Q2/Q1 < 0.30 \quad (1);$$

and $$Q1 > 10 \ J/g \quad (2).$$

9. A developer, comprising:
a toner, wherein the toner comprises:
a copolymerization resin,
wherein the copolymerization resin comprises: a unit derived from a polyester resin including a polycarboxylic acid having a valence of 2 or more and a polyol having a valence of 2 or more; and a unit derived from a resin having a polyhydroxycarboxylic acid skeleton, where the unit derived from the resin having a polyhydroxycarboxylic acid skeleton is bonded to the unit derived from the polyester resin via at least one of a urethane group and a urea group, and
wherein the toner has a relative degree of crystallization of 10% or more and less than 50%.

10. An image forming apparatus, comprising:
an electrostatic latent image bearing member;
an electrostatic latent image forming unit configured to form an electrostatic latent image on the electrostatic latent image bearing member;
a developing unit configured to develop the electrostatic latent image with a toner to form a visible image;
a transferring unit configured to transfer the visible image onto a recording medium; and
a fixing unit configured to fix the visible image transferred onto the recording medium,
wherein the toner comprises:
a copolymerization resin,
wherein the copolymerization resin comprises: a unit derived from a polyester resin including a polycarboxylic acid having a valence of 2 or more and a polyol having a valence of 2 or more; and a unit derived from a resin having a polyhydroxycarboxylic acid skeleton, where the unit derived from the resin having a polyhydroxycarboxylic acid skeleton is bonded to the unit derived from the polyester resin via at least one of a urethane group and a urea group, and
wherein the toner has a relative degree of crystallization of 10% or more and less than 50%.

* * * * *